United States Patent
Zhu et al.

(10) Patent No.: US 11,582,406 B2
(45) Date of Patent: Feb. 14, 2023

(54) SOLID-STATE IMAGE SENSOR AND IMAGING DEVICE

(71) Applicant: SONY SEMICONDUCTOR SOLUTIONS CORPORATION, Kanagawa (JP)

(72) Inventors: Hongbo Zhu, Kanagawa (JP); Masaki Sakakibara, Kanagawa (JP)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 0 days.

(21) Appl. No.: 17/309,343

(22) PCT Filed: Oct. 25, 2019

(86) PCT No.: PCT/JP2019/041930
§ 371 (c)(1),
(2) Date: May 20, 2021

(87) PCT Pub. No.: WO2020/110537
PCT Pub. Date: Jun. 4, 2020

(65) Prior Publication Data
US 2022/0132054 A1    Apr. 28, 2022

(30) Foreign Application Priority Data
Nov. 29, 2018  (JP) .............................. JP2018-223478

(51) Int. Cl.
*H04N 5/3745*  (2011.01)
*H04N 5/378*   (2011.01)
(Continued)

(52) U.S. Cl.
CPC ........... *H04N 5/351* (2013.01); *H04N 5/3454* (2013.01); *H04N 5/378* (2013.01); *H04N 5/3745* (2013.01)

(58) Field of Classification Search
CPC .... H04N 5/3454; H04N 5/351; H04N 5/3696; H04N 5/3745; H04N 5/378; H04N 5/379
See application file for complete search history.

(56) References Cited

U.S. PATENT DOCUMENTS 9,001,220 B2 * 4/2015 Kim ..................... H04N 5/3696
                                                      348/222.1
2017/0059399 A1  3/2017 Suh et al.
(Continued)

FOREIGN PATENT DOCUMENTS

CN   106488151 A   3/2017
CN   108702469 A   10/2018
(Continued)

OTHER PUBLICATIONS

International Search Report and Written Opinion of PCT Application No. PCT/JP2019/041930, dated Dec. 10, 2019, 12 pages of ISRWO.

(Continued)

*Primary Examiner* — Lin Ye
*Assistant Examiner* — Chriss S Yoder, III
(74) *Attorney, Agent, or Firm* — Chip Law Group

(57) ABSTRACT

To reduce a circuit scale in a solid-state image sensor that detects an address event. The solid-state image sensor includes a pixel array unit and a drive circuit. In the solid-state image sensor, in the pixel array unit, a logarithmic response pixel that outputs an analog signal proportional to a logarithmic value of an incident light amount and a detection pixel that detects whether or not a change amount of the incident light amount has exceeded a predetermined threshold and outputs a detection signal indicating a detection result are arrayed. Furthermore, in the solid-state image sensor, the drive circuit drives the logarithmic response pixel and the detection pixel to output the analog signal and the detection signal.

14 Claims, 23 Drawing Sheets

(51) Int. Cl.
    *H04N 5/351*     (2011.01)
    *H04N 5/345*     (2011.01)

(56)           References Cited

U.S. PATENT DOCUMENTS

| | | |
|---|---|---|
| 2018/0058926 A1* | 3/2018 | Suh .......................... H03F 1/342 |
| 2018/0167575 A1* | 6/2018 | Watanabe ............ H04N 5/3745 |
| 2019/0051680 A1* | 2/2019 | Hanzawa ................ H04N 5/379 |
| 2019/0052820 A1* | 2/2019 | Berner ................... H04N 5/351 |
| 2021/0037202 A1* | 2/2021 | Chen .......................... G01J 1/16 |

FOREIGN PATENT DOCUMENTS

| | | |
|---|---|---|
| EP | 3139595 A1 | 3/2017 |
| JP | 2017-050853 A | 3/2017 |
| JP | 2018-186478 A | 11/2018 |
| KR | 10-2017-0027107 A | 3/2017 |
| KR | 10-2018-0024384 A | 3/2018 |
| KR | 10-2018-0116280 A | 10/2018 |
| WO | 2017/150240 A1 | 9/2017 |
| WO | 2018/198691 A1 | 11/2018 |

OTHER PUBLICATIONS

Haung, et al., "A Dynamic Vision Sensor with Direct Logarithmic Output and Full-frame Picture-On-Demand", IEEE International Symposium on Circuits and Systems (ISCAS), 2017, 4 pages.

* cited by examiner

SOLID-STATE IMAGE SENSOR AND IMAGING DEVICE

CROSS REFERENCE TO RELATED APPLICATIONS

This application is a U.S. National Phase of International Patent Application No. PCT/JP2019/041930 filed on Oct. 25, 2019, which claims priority benefit of Japanese Patent Application No. JP 2018-223478 filed in the Japan Patent Office on Nov. 29, 2018. Each of the above-referenced applications is hereby incorporated herein by reference in its entirety.

TECHNICAL FIELD

The present technology relates to a solid-state image sensor and an imaging device. The present technology relates to a solid-state image sensor that determines whether or not a change amount of incident light exceeds a threshold, and an imaging device.

BACKGROUND ART

Conventionally, a synchronous solid-state image sensor for capturing image data (frame) in synchronization with a synchronous signal such as a vertical synchronous signal has been used in an imaging device or the like. The typical synchronous solid-state image sensor can acquire the image data only at each cycle (for example, 1/60 seconds) of the synchronous signal, and is thus difficult to deal with a case where higher-speed processing is required in the fields of transportation, robots, and the like. Therefore, an asynchronous solid-state image sensor provided with a detection circuit for each pixel, the detection circuit detecting that, for each pixel address, a change amount of a light amount of the pixel has exceeded a threshold as an address event in real time has been proposed (for example, see Non-Patent Document 1). Such a solid-state image sensor for detecting an address event for each pixel is called dynamic vision sensor (DVS).

CITATION LIST

Non-Patent Document

Non-Patent Document 1: Jing Huang, et al., A Dynamic Vision Sensor with Direct Logarithmic Output and Full-frame Picture-On-Demand, 2017 IEEE International Symposium on Circuits and Systems (ISCAS)

SUMMARY OF THE INVENTION

Problems to be Solved by the Invention

The above-described asynchronous solid-state image sensor (that is, DVS) can generate and output data at a much higher speed than the synchronous solid-state image sensor. Therefore, for example, in the transportation field, processing of recognizing a person or an obstacle as an image is executed at a high speed, and safety can be improved. However, the detection circuit for an address event has a larger number of elements such as transistors than a synchronous pixel circuit, and there is a problem that the circuit scale increases if such a circuit is provided for each pixel.

The present technology has been made in view of such a situation, and an object is to reduce the circuit scale in a solid-state image sensor that detects an address event.

Solutions to Problems

The present technology has been made to solve the above-described problem and the first aspect is a solid-state image sensor including a pixel array unit in which a logarithmic response pixel that outputs an analog signal proportional to a logarithmic value of an incident light amount and a detection pixel that detects whether or not a change amount of the incident light amount has exceeded a predetermined threshold and outputs a detection signal indicating a detection result are arrayed, and a drive circuit configured to drive the logarithmic response pixel and the detection pixel and output the analog signal and the detection signal. This brings about an effect that imaging is performed while an address event is detected.

Furthermore, in the first aspect, the logarithmic response pixel may include a photoelectric conversion element configured to generate a photocurrent by photoelectric conversion, a current-voltage conversion unit configured to convert the photocurrent into a voltage proportional to a logarithmic value of the photocurrent, and a logarithmic value readout circuit configured to amplify the voltage and output the amplified voltage as the analog signal. This brings about an effect that the voltage according to the logarithmic value of the photocurrent is output.

Furthermore, in the first aspect, the current-voltage conversion unit may include an N-type transistor having a source connected to the photoelectric conversion element, and a gate and a drain connected to a predetermined power supply terminal, and a connection point of the photoelectric conversion element and the N-type transistor may be connected to the logarithmic value readout circuit. This brings about an effect that the analog signal is read out.

Furthermore, in the first aspect, the current-voltage conversion unit may include an N-type transistor having a gate connected to the logarithmic value readout circuit, a source connected to the photoelectric conversion element, and a drain connected to a predetermined power supply terminal, and an inverter configured to invert a potential of a connection point of the N-type transistor and the photoelectric conversion element and output the inverted potential to the gate. This brings about an effect that a photocurrent is converted into a voltage.

Furthermore, in the first aspect, the current-voltage conversion unit may include an N-type transistor and a first P-type transistor connected in series between a power supply terminal and a reference terminal, and a second P-type transistor inserted between a connection point of the N-type transistor and the first P-type transistor and the photoelectric conversion element. This brings about an effect that a photocurrent is converted into a voltage.

Furthermore, in the first aspect, the current-voltage conversion unit may be provided with two-stage loop circuits, and each of the loop circuits may include a pair of N-type transistors connected in a loop manner. This brings about an effect that a photocurrent is converted into a voltage.

Furthermore, in the first aspect, the current-voltage conversion unit may include a first N-type transistor having a gate connected to the logarithmic value readout circuit, a source connected to the photoelectric conversion element, and a drain connected to a predetermined power supply terminal, a second N-type transistor having a gate connected to a connection point of the first N-type transistor and the photoelectric conversion element, and a drain connected to a predetermined reference terminal, and a P-type transistor inserted between the second N-type transistor and the power supply terminal. This brings about an effect that a photocurrent is converted into a voltage.

Furthermore, in the first aspect, the current-voltage conversion unit may further include a capacitance inserted between the gate of the first N-type transistor and the gate of the second N-type transistor. This brings about an effect that a photocurrent is converted into a voltage.

Furthermore, in the first aspect, a predetermined number of the detection pixels and the predetermined number of the logarithmic response pixels may be arrayed in the pixel array unit. This brings about an effect that the same number of the analog signals as the detection signals are output.

Furthermore, in the first aspect, a predetermined number of the detection pixels and a number of the logarithmic response pixels, the number being larger than the predetermined number, may be arrayed in the pixel array unit. This brings about an effect that a larger number of the analog signals than the detection signals are output.

Furthermore, in the first aspect, the detection pixels may be arrayed every other pixel in a predetermined direction and a direction perpendicular to the predetermined direction. This brings about an effect that a larger number of the analog signals than the detection signals are output.

Furthermore, in the first aspect, the logarithmic response pixels may be arrayed in a two-dimensional lattice manner, and the detection pixels may be arrayed along a predetermined direction. This brings about an effect that a larger number of the analog signals than the detection signals are output.

Furthermore, in the first aspect, the detection pixel may be larger than the logarithmic response pixel in size. This brings about an effect that a larger number of the analog signals than the detection signals are output.

Furthermore, in the first aspect, the detection pixel may further output an analog signal proportional to the logarithmic value of the light amount. This brings about an effect that a larger number of the analog signals than the detection signals are output.

Furthermore, in the first aspect, the logarithmic response pixel may detect whether or not the change amount of the light amount has exceeded the predetermined threshold, and may further output a detection signal indicating a detection result. This brings about an effect that a larger number of the detection signals than the analog signals are output.

Furthermore, in the first aspect, the logarithmic response pixel may include a first logarithmic response unit configured to convert a photocurrent into a first voltage proportional to a logarithmic value of the photocurrent, and a first logarithmic value readout circuit configured to amplify the first voltage and output the amplified first voltage as the analog signal, and the detection pixel may include a second logarithmic response unit configured to convert a photocurrent into a second voltage proportional to a logarithmic value of the photocurrent, and a detection circuit configured to detect whether or not a change amount of one of the first and second voltages has exceeded the threshold, and output the detection signal. This brings about an effect that a circuit scale is reduced.

Furthermore, the second aspect of the present technology is an imaging device including a pixel array unit in which a logarithmic response pixel that outputs an analog signal proportional to a logarithmic value of an incident light amount and a detection pixel that detects whether or not a change amount of the incident light amount has exceeded a predetermined threshold and outputs a detection signal indicating a detection result are arrayed, a drive circuit configured to drive the logarithmic response pixel and the detection pixel and output the analog signal and the detection signal, and an analog-digital conversion unit configured to convert the analog signal into a digital signal. This brings about an effect that the analog signal is read out while an address event is detected.

MODE FOR CARRYING OUT THE INVENTION

Hereinafter, modes for implementing the present technology (hereinafter referred to as embodiments) will be described. Description will be given according to the following order.

1. First Embodiment (an example in which address event detection pixels and logarithmic response pixels are arrayed)

2. Second Embodiment (an example in which address event detection pixels that also generate pixel signals and logarithmic response pixels are arrayed)

3. Third Embodiment (an example in which address event detection pixels and logarithmic response pixels that generate detection signals are arrayed)

4. Fourth Embodiment (an example in which address event detection pixels and logarithmic response pixels sharing an address event detection circuit are arrayed)

5. Applications to Moving Bodies

1. First Embodiment

[Configuration Example of Imaging Device]

Figure 1:
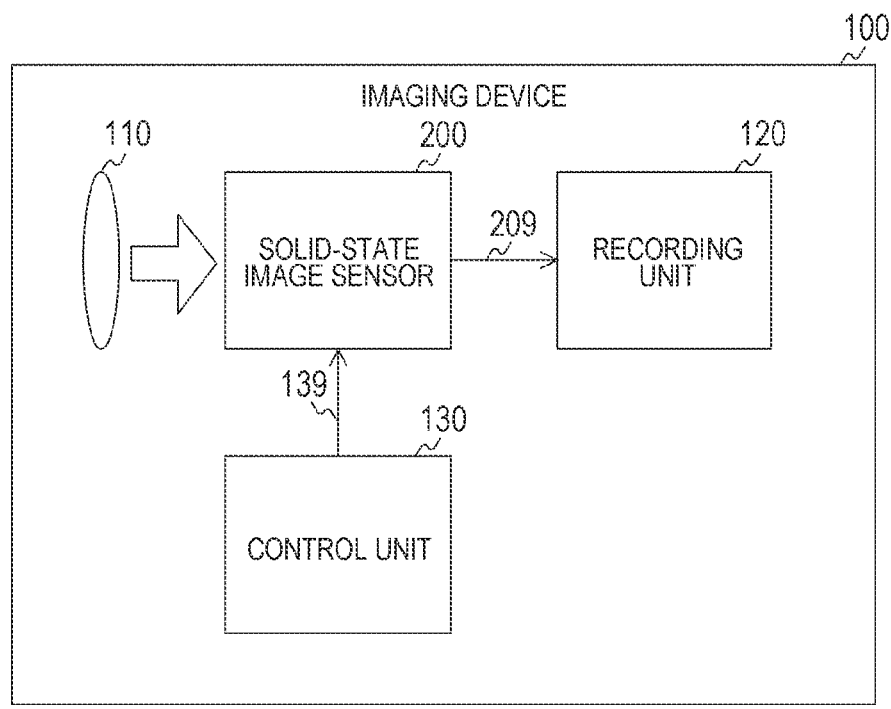
FIG. 1 is a block diagram illustrating a configuration example of an imaging device according to a first embodiment of the present technology.

FIG. 1 is a block diagram illustrating a configuration example of an imaging device 100 according to a first embodiment of the present technology. The imaging device 100 includes an imaging lens 110, a solid-state image sensor 200, a recording unit 120, and a control unit 130. As the imaging device 100, a camera mounted on an industrial robot, an in-vehicle camera, or the like is assumed.

The imaging lens 110 condenses incident light and guides the incident light to the solid-state image sensor 200. The solid-state image sensor 200 detects the presence or absence of an address event while capturing image data, and generates a detection result of the detection. Here, the address event includes an on-event and an off-event, and the detection result includes a one-bit on-event detection result and a one-bit off-event detection result. The on-event means that a change amount of an incident light amount has exceeded a predetermined upper limit threshold. Meanwhile, the off-event means that the change amount of the light amount has fallen below a predetermined lower limit threshold. The solid-state image sensor 200 processes the detection result of the address event and outputs data indicating a processing result and the image data to the recording unit 120 via a signal line 209. Note that the solid-state image sensor 200 may detect only one of the on-event and the off-event.

The recording unit 120 records the data from the solid-state image sensor 200. The control unit 130 detects the presence or absence of an address event while controlling the solid-state image sensor 200 to capture image data.

[Configuration Example of Solid-State Image Sensor]

Figure 2:
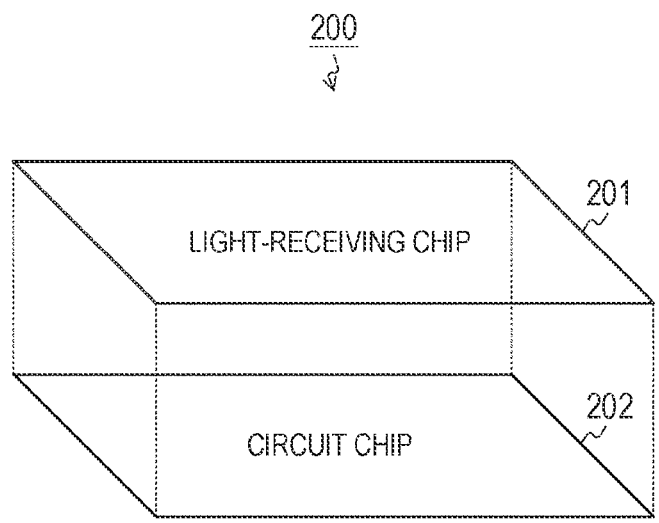
FIG. 2 is a diagram illustrating an example of a stacked structure of a solid-state image sensor according to the first embodiment of the present technology.

FIG. 2 is a diagram illustrating an example of a stacked structure of the solid-state image sensor 200 according to the first embodiment of the present technology. The solid-state image sensor 200 includes a circuit chip 202 and a light-receiving chip 201 stacked on the circuit chip 202. These chips are electrically connected via a connection part such as a via. Note that Cu—Cu bonding or bump can be used for connection in addition to the via.

Figure 3:
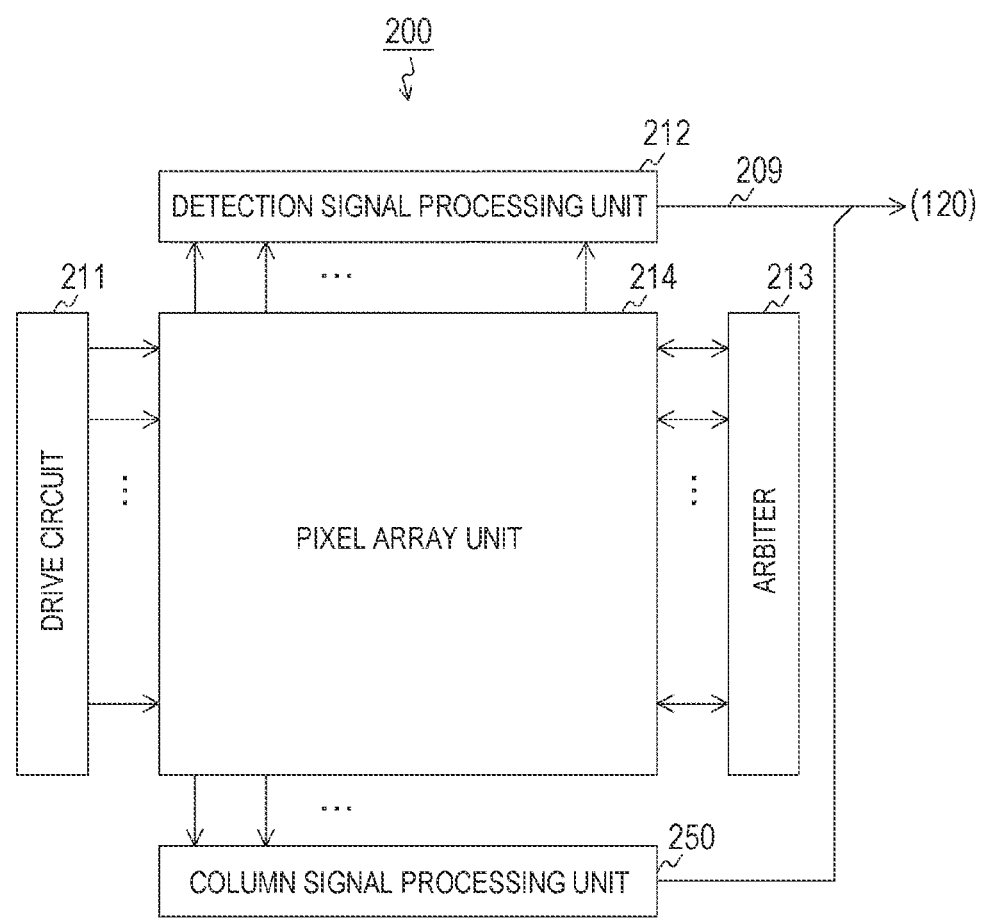
FIG. 3 is a block diagram illustrating a configuration example of the solid-state image sensor according to the first embodiment of the present technology.

FIG. 3 is a block diagram illustrating a configuration example of the solid-state image sensor 200 according to the first embodiment of the present technology. The solid-state image sensor 200 includes a drive circuit 211, a detection signal processing unit 212, an arbiter 213, a pixel array unit 214, and a column signal processing unit 250.

In the pixel array unit 214, a plurality of pixels is arrayed in a two-dimensional lattice manner. Some of these pixels detect an address event and supply a detection signal indicating the detection result to the detection signal processing unit 212. Meanwhile, the remaining pixels generate an analog pixel signal having a voltage proportional to a logarithmic value of the light amount of the incident light and output the analog pixel signal to the column signal processing unit 250.

The drive circuit 211 drives the pixels in the pixel array unit 214 and outputs the detection signals and the pixel signals.

The arbiter 213 arbitrates requests from the pixel array unit 214, and transmits a response to the pixel array unit 214 on the basis of an arbitration result.

The detection signal processing unit 212 executes predetermined signal processing such as image recognition processing for the detection signal from the pixel array unit 214. The detection signal processing unit 212 supplies data indicating a processing result to the recording unit 120 via the signal line 209.

The column signal processing unit 250 performs analog to digital (AD) conversion processing of converting the pixel signal from the pixel array unit 214 into a digital signal. The column signal processing unit 250 performs various types of signal processing such as correlated double sampling (CDS) processing and dark current correction as necessary in addition to the AD conversion processing, and supplies image data including the processed digital signal to the recording unit 120. Note that the column signal processing unit 250 is an example of an analog-digital conversion unit described in the claims.

[Configuration Example of Pixel Array Unit]

Figure 4:
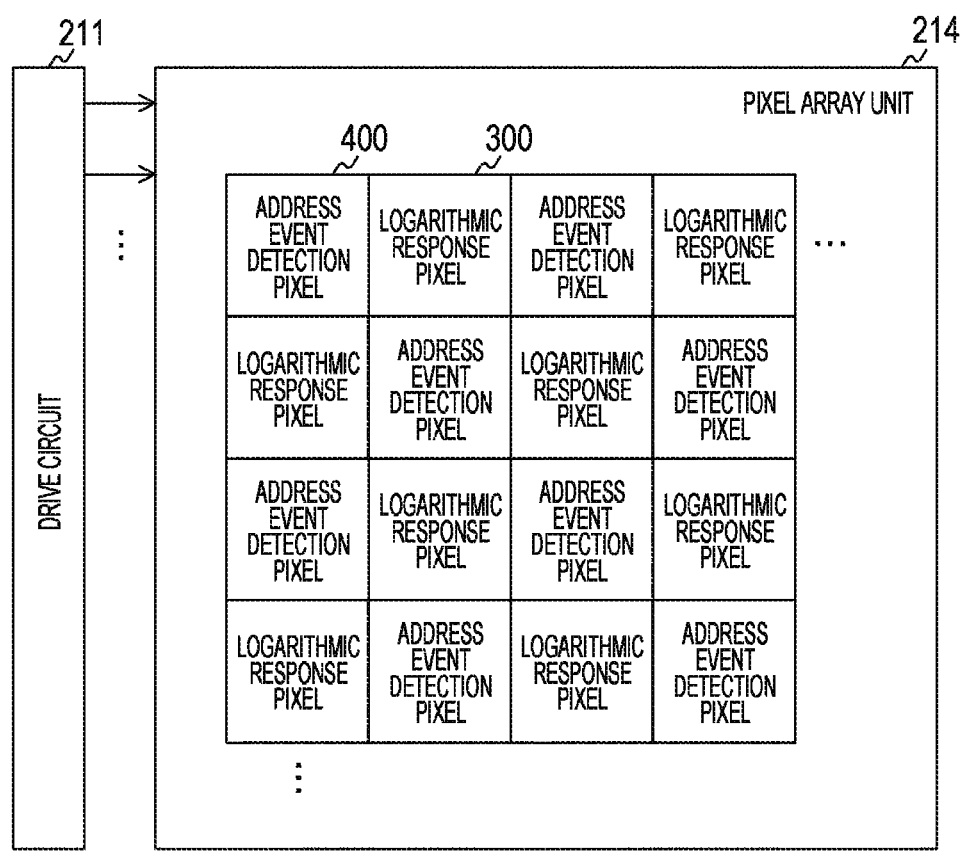
FIG. 4 is a plan view illustrating a configuration example of a pixel array unit according to the first embodiment of the present technology.

FIG. 4 is a plan view illustrating a configuration example of the pixel array unit 214 according to the first embodiment of the present technology. In this pixel array unit 214, N (N is an integer) address event detection pixels 400 and N logarithmic response pixels 300 are arrayed. For example, the address event detection pixel 400 is arranged on one of black and white in a checker pattern, and the logarithmic response pixel 300 is arranged on the other. Note that the pixel array pattern is not limited to the checker pattern.

The address event detection pixel 400 detects the presence or absence of an address event and supplies the detection signal indicating the detection result to the detection signal processing unit 212.

The logarithmic response pixel 300 generates the analog pixel signal having a voltage proportional to a logarithmic value of the light amount of the incident light and outputs the analog pixel signal to the column signal processing unit 250.

The drive circuit 211 drives the address event detection pixel 400 and the logarithmic response pixel 300. Furthermore, when driving the logarithmic response pixel 300, the drive circuit 211 drives the logarithmic response pixel 300 in synchronization with, for example, a vertical synchronous signal. Here, the vertical synchronous signal is a signal having a predetermined frequency (30 hertz or the like) indicating imaging timing of image data.

By arraying the address event detection pixel 400 and the logarithmic response pixel 300, the solid-state image sensor 200 can capture the image data including a pixel value according to the logarithmic value of the light amount while implementing the DVS function. It is conceivable to separately mount a DVS in which only the address event detection pixels 400 are arrayed and a solid-state image sensor in which only the logarithmic response pixels 300 are arrayed, but this configuration is not favorable. This is because the circuit scale and cost increase, and data obtained by the DVS and data obtained by the solid-state image sensor have a gap due to a difference in mounting positions of two solid-state image sensors.

[Configuration Example of Address Event Detection Pixel]

Figure 5:
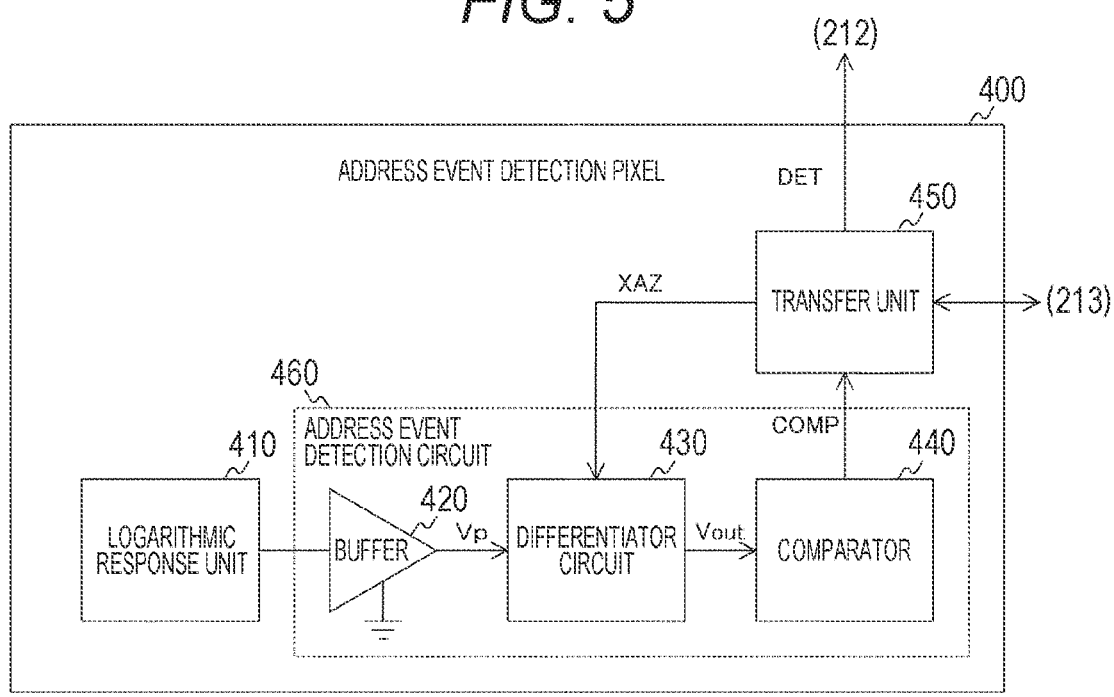
FIG. 5 is a block diagram illustrating a configuration example of an address event detection pixel according to the first embodiment of the present technology.

FIG. 5 is a block diagram illustrating a configuration example of the address event detection pixel 400 according to the first embodiment of the present technology. The address event detection pixel 400 includes a logarithmic response unit 410, an address event detection circuit 460, and a transfer unit 450.

The logarithmic response unit 410 converts a photocurrent into a pixel voltage Vp proportional to a logarithmic value of the photocurrent. The logarithmic response unit 410 supplies the pixel voltage Vp to the address event detection circuit 460.

The address event detection circuit 460 detects whether or not the change amount in the pixel voltage Vp exceeds a predetermined threshold (upper limit threshold or lower limit threshold). The address event detection circuit 460 includes a buffer 420, a differentiator circuit 430, and a comparator 440.

The buffer 420 outputs the pixel voltage Vp from the logarithmic response unit 410 to the differentiator circuit 430. The buffer 420 can improve a drive force for driving a rear stage. Furthermore, the buffer 420 can secure isolation of noise associated with a rear-stage switching operation.

The differentiator circuit 430 obtains the change amount of the pixel voltage Vp by differential operation. The change amount of the pixel voltage Vp indicates the change amount of the light amount. The differentiator circuit 430 supplies a differential signal Vout indicating the change amount of the light amount to the comparator 440.

The comparator 440 compares the differential signal Vout with the predetermined threshold (upper limit threshold or lower limit threshold). A comparison result COMP of the comparator 440 indicates the detection result of the address event. The comparator 440 supplies the comparison result COMP to the transfer unit 450.

The transfer unit 450 transfers a detection signal DET and supplies an auto-zero signal XAZ to the differentiator circuit 430 for initialization after the transfer. The transfer unit 450 supplies a request for requesting transfer of the detection signal DET to the arbiter 213 when the address event is detected. Then, when receiving a response to the request, the transfer unit 450 supplies the comparison result COMP as the detection signal DET to the detection signal processing unit 212 and supplies the auto-zero signal XAZ to the differentiator circuit 430.

[Configuration Example of Address Event Detection Circuit]

Figure 6:
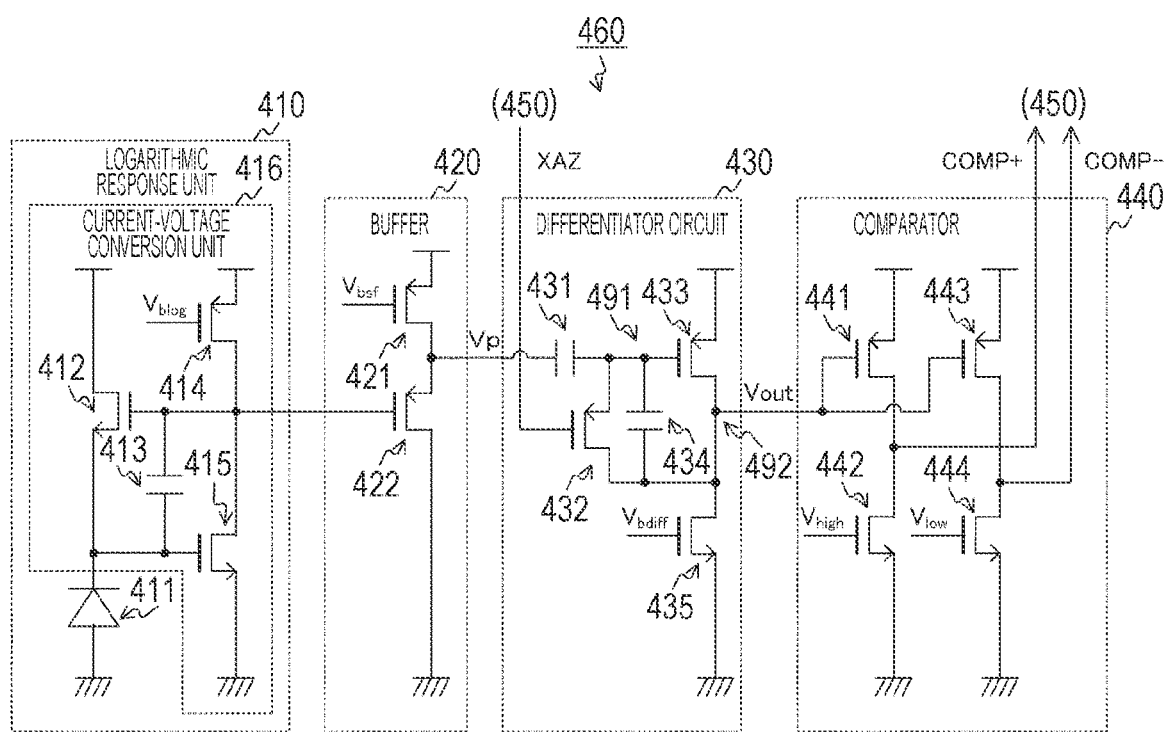
FIG. 6 is a circuit diagram illustrating a configuration example of an address event detection circuit according to the first embodiment of the present technology.

FIG. 6 is a circuit diagram illustrating a configuration example of the address event detection circuit 460 according to the first embodiment of the present technology.

The logarithmic response unit 410 includes a photoelectric conversion element 411 and a current-voltage conversion unit 416. The photoelectric conversion element 411 generates a photocurrent by photoelectric conversion for incident light. The current-voltage conversion unit 416 logarithmically converts the photocurrent into a pixel voltage Vp. The current-voltage conversion unit 416 includes N-type transistors 412 and 415, a capacitance 413, and a P-type transistor 414. Metal-oxide-semiconductor (MOS) transistors are used as the N-type transistor 412, the P-type transistor 414, and the N-type transistor 415, for example.

A source of the N-type transistor 412 is connected to a cathode of the photoelectric conversion element 411, and a drain of the N-type transistor 412 is connected to a power supply terminal. The P-type transistor 414 and the N-type transistor 415 are connected in series between the power supply terminal and a reference terminal having a predetermined reference potential (ground potential or the like). Furthermore, a connection point between the P-type transistor 414 and the N-type transistor 415 is connected to a gate of the N-type transistor 412 and an input terminal of the buffer 420. A connection point between the N-type transistor 412 and the photoelectric conversion element 411 is connected to a gate of the N-type transistor 415.

Furthermore, a predetermined bias voltage Vblog is applied to a gate of the P-type transistor 414. The capacitance 413 is inserted between the gate of the N-type transistor 412 and the gate of the N-type transistor 415.

Furthermore, for example, the photoelectric conversion element 411 is arranged on the light-receiving chip 201, and a rear-stage circuit is arranged on the circuit chip 202. Note that the circuits and elements arranged on the light-receiving chip 201 and the circuit chip 202 are not limited to this configuration. For example, the photoelectric conversion element 411, the N-type transistors 412 and 415, and the capacitance 413 can be arranged on the light-receiving chip 201, and the rear-stage circuit can be arranged on the circuit chip 202.

The buffer 420 includes P-type transistors 421 and 422. For example, a MOS transistor is used as the transistors.

In the buffer 420, the P-type transistors 421 and 422 are connected in series between the power supply terminal and the reference potential terminal. Furthermore, a gate of the P-type transistor 422 is connected to the logarithmic response unit 410, and a connection point of the P-type transistors 421 and 422 is connected to the differentiator circuit 430. A predetermined bias voltage Vbsf is applied to a gate of the P-type transistor 421.

The differentiator circuit 430 includes capacitances 431 and 434, P-type transistors 432 and 433, and an N-type transistor 435. For example, a MOS transistor is used as transistors in the differentiator circuit 430, for example.

The P-type transistor 433 and the N-type transistor 435 are connected in series between the power supply terminal and the reference potential terminal. A predetermined bias voltage Vbdiff is input to a gate of the N-type transistor 435. These transistors function as an inverting circuit having the gate of the P-type transistor 433 as an input terminal 491 and the connection point of the P-type transistor 433 and the N-type transistor 435 as an output terminal 492.

The capacitance 431 is inserted between the buffer 420 and the input terminal 491. The capacitance 431 supplies a current according to time derivative of (in other words, the change amount in) the pixel voltage Vp from the buffer 420 to the input terminal 491. Furthermore, the capacitance 434 is inserted between the input terminal 491 and the output terminal 492.

The P-type transistor 432 opens or closes a path between the input terminal 491 and the output terminal 492 according to the auto-zero signal XAZ from the transfer unit 450. For example, when the low-level auto-zero signal XAZ is input, the P-type transistor 432 transitions to the on state according to the auto-zero signal XAZ and sets the differential signal Vout to the initial value.

The comparator 440 includes P-type transistors 441 and 443 and N-type transistors 442 and 444. For example, a MOS transistor is used as the transistors.

In the comparator 440, the P-type transistor 441 and the N-type transistor 442 are connected in series between the power supply terminal and the reference terminal, and the P-type transistor 443 and the N-type transistor 444 are also connected in series between the power supply terminal and the reference terminal. Furthermore, gates of the P-type transistors 441 and 443 are connected to the differentiator circuit 430. An upper limit voltage Vhigh indicating an upper limit threshold is applied to a gate of the N-type transistor 442, and a lower limit voltage Vlow indicating a lower limit threshold is applied to a gate of the N-type transistor 444.

A connection point of the P-type transistor 441 and the N-type transistor 442 is connected to the transfer unit 450, and a voltage at this connection point is output as a comparison result COMP+ with respect to the upper limit threshold. A connection point of the P-type transistor 443 and the N-type transistor 444 is connected to the transfer unit 450, and a voltage at this connection point is output as a comparison result COMP− with respect to the lower limit threshold. With such a connection, the comparator 440 outputs the high-level comparison result COMP+ in a case where the differential signal Vout is higher than the upper limit voltage Vhigh, and outputs the low-level comparison result COMP− in a case where the differential signal Vout is lower than the lower limit voltage Vlow. The comparison result COMP is a signal including these comparison results COMP+ and COMP−.

Note that the comparator 440 compares both the upper limit threshold and the lower limit threshold with the differential signal Vout. However, the comparator 440 may compare only one of the upper limit threshold and the lower limit threshold with the differential signal Vout. In this case, unnecessary transistors can be eliminated. For example, when comparing the differential signal Vout only with the upper limit threshold, only the P-type transistor 441 and the N-type transistor 442 are arranged.

Figure 7:
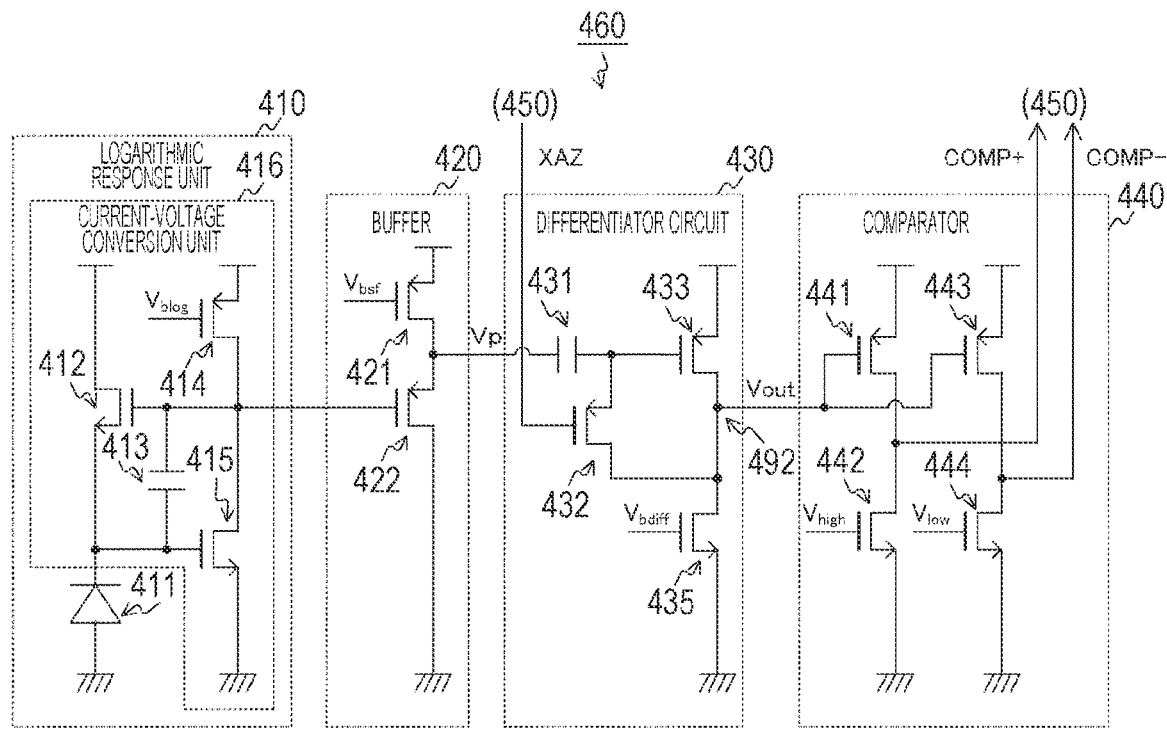
FIG. 7 is a circuit diagram illustrating a configuration example of the address event detection circuit with a reduced capacitance according to the first embodiment of the present technology.

Furthermore, the capacitance 434 is arranged in the differentiator circuit 430, but the capacitance 434 can be reduced as illustrated in FIG. 7.

Figure 8:
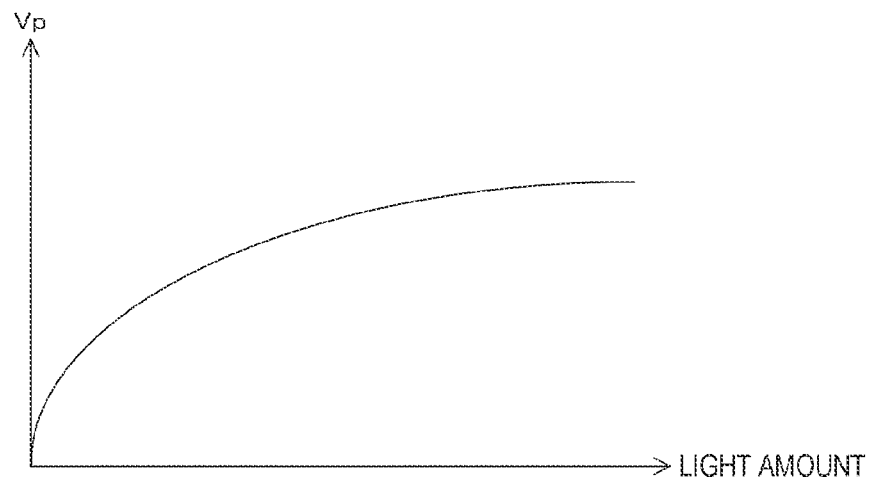
FIG. 8 is a graph illustrating an example of a pixel voltage Vp with respect to a light amount according to the first embodiment of the present technology.

FIG. 8 is a graph illustrating an example of the pixel voltage Vp with respect to the light amount according to the first embodiment of the present technology. In FIG. 8, the vertical axis represents the pixel voltage Vp, and the horizontal axis represents the light amount of the incident light. As illustrated in FIG. 8, the logarithmic response unit 410 outputs the pixel voltage Vp proportional to the logarithmic value of the light amount. Thereby, an overflow of the digital signal converted from the pixel voltage Vp can be suppressed when the light amount is large (that is, bright). By suppressing the overflow, expansion of a dynamic range of the image data becomes easy and the image quality of the image data can be improved.

[Configuration Example of Logarithmic Response Pixel]

Figure 9:
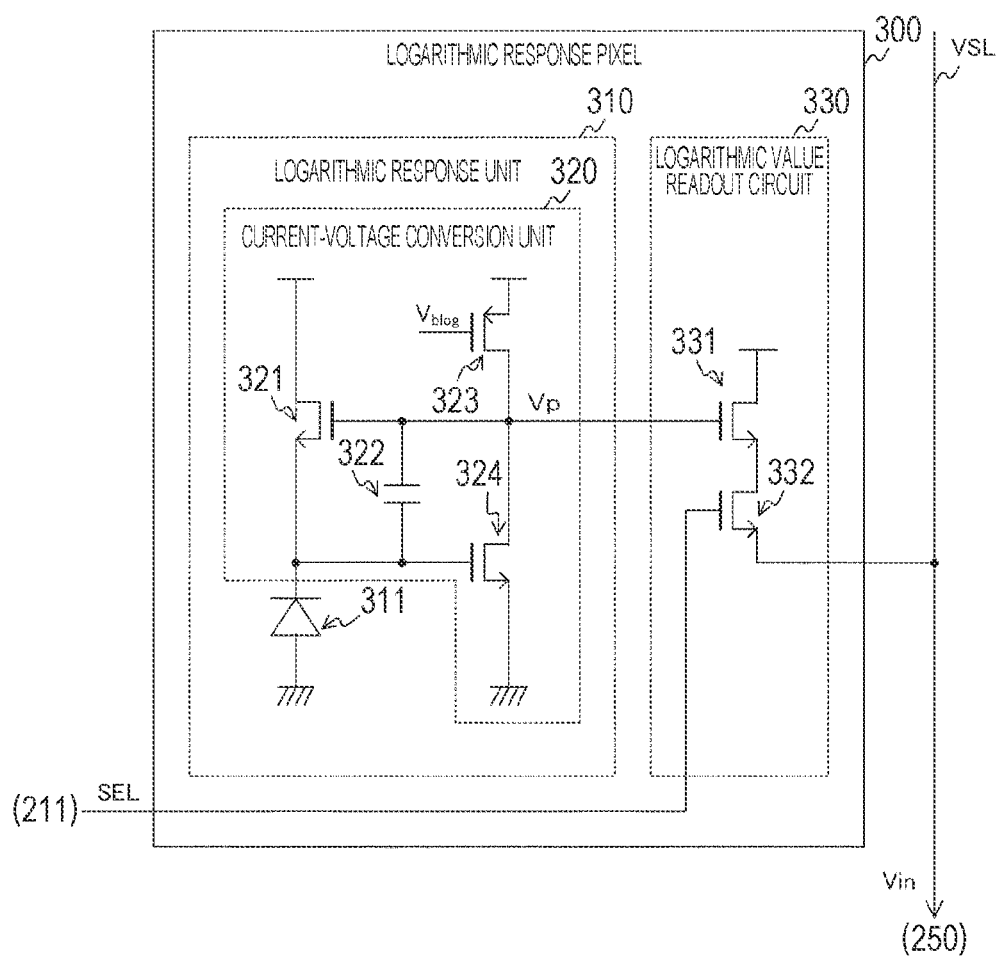
FIG. 9 is a circuit diagram illustrating a configuration example of a logarithmic response pixel according to the first embodiment of the present technology.

FIG. 9 is a circuit diagram illustrating a configuration example of the logarithmic response pixel 300 according to the first embodiment of the present technology. The logarithmic response pixel 300 includes a logarithmic response unit 310 and a logarithmic value readout circuit 330. The logarithmic response unit 310 includes a photoelectric conversion element 311 and a current-voltage conversion unit 320. The current-voltage conversion unit 320 includes N-type transistors 321 and 324, a capacitance 322, and a P-type transistor 323. The connection configuration of the elements in the current-voltage conversion unit 320 in FIG. 9 is similar to the connection configuration of the corresponding elements in the current-voltage conversion unit 416 illustrated in FIG. 6. Note that the N-type transistor 321 is an example of a first N-type transistor described in the claims, and the N-type transistor 324 is an example of a second N-type transistor described in the claims.

The logarithmic value readout circuit 330 amplifies the pixel voltage Vp and outputs the amplified voltage as an analog pixel signal Vin. The logarithmic value readout circuit 330 includes an amplification transistor 331 and a selection transistor 332. An N-type MOS transistor is used as these transistors, for example.

The amplification transistor 331 amplifies the pixel voltage Vp and supplies the amplified voltage as a pixel signal Vin to the selection transistor 332. The selection transistor 332 supplies the pixel signal Vin to the column signal processing unit 250 via a vertical signal line VSL according to a selection signal SEL from the drive circuit 211. The vertical signal line VSL is wired for each column along the column direction in the pixel array unit 214.

[Configuration Example of Column Signal Processing Unit]

Figure 10:
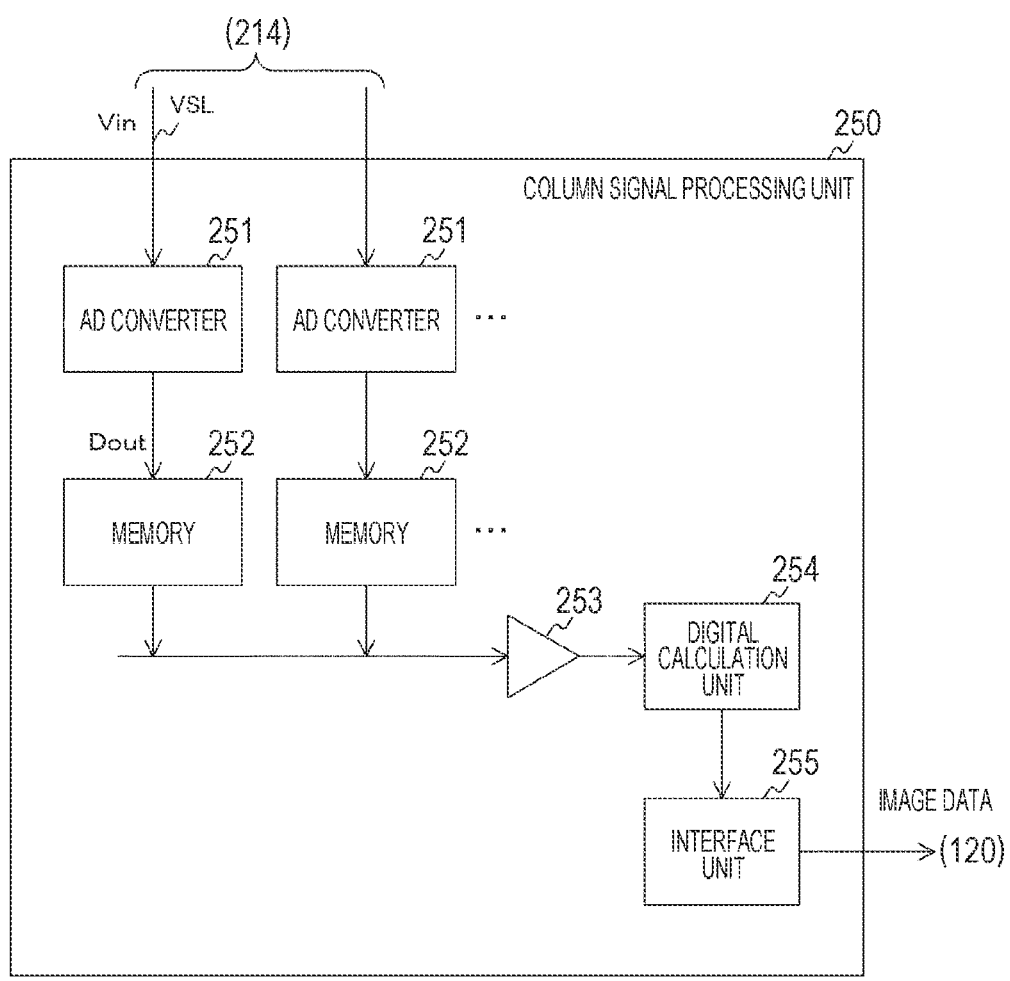
FIG. 10 is a block diagram illustrating a configuration example of a column signal processing unit according to the first embodiment of the present technology.

FIG. 10 is a block diagram illustrating a configuration example of the column signal processing unit 250 according to the first embodiment of the present technology. The column signal processing unit 250 includes a plurality of AD converters 251, a plurality of memories 252, an output unit 253, a digital calculation unit 254, and an interface unit 255. The AD converter 251 and the memory 252 are arranged for each column. Y AD converters 251 and Y memories 252 are arranged where the number of columns is Y (Y is an integer).

The AD converter 251 performs AD conversion processing and CDS processing for the analog pixel signal Vin of a corresponding column. The AD converter 251 causes the corresponding memory 252 to store a processed digital signal Dout. Note that the AD converter 251 may perform only the AD conversion processing and a subsequent circuit may perform the CDS processing.

The memory 252 stores the digital signal Dout. The output unit 253 reads out the digital signal Dout stored in the memory 252 in order and outputs the digital signal Dout to the digital calculation unit 254.

The digital calculation unit 254 performs predetermined signal processing such as dark current correction processing and demosaic processing for the digital signal Dout. The digital calculation unit 254 supplies image data including the processed pixel signal to the interface unit 255.

The interface unit 255 outputs the image data from the digital calculation unit 254 to the recording unit 120.

[Operation Example of Solid-State Image Sensor]

Figure 11:
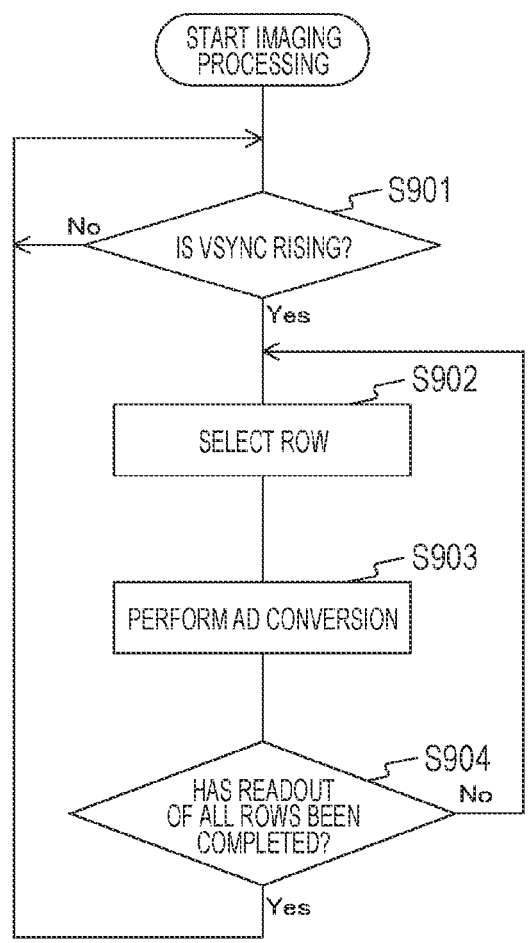
FIG. 11 is a flowchart illustrating an example of imaging processing according to the first embodiment of the present technology.

FIG. 11 is a flowchart illustrating an example of the imaging processing according to the first embodiment of the present technology. The imaging processing is started when, for example, a predetermined application for capturing image data is executed.

The drive circuit 211 in the solid-state image sensor 200 determines whether or not it is falling timing of a vertical synchronous signal VSYNC (step S901). In the case of the falling timing of VSYNC (step S901: Yes), the drive circuit 211 selects and drives one of the rows (step S902). The column signal processing unit 250 performs AD conversion for the pixel signal from the selected row (step S903).

The drive circuit 211 determines whether or not the AD conversion (that is, readout) of all rows has been completed (step S904). In a case where the readout of all the rows has not been completed (step S904: No), the drive circuit 211 repeats the processing of step S902 and the subsequent steps.

On the other hand, in a case where the readout of all the rows has been completed (step S904: Yes), the solid-state image sensor 200 repeatedly executes the processing of step S901 and the subsequent steps.

Figure 12:
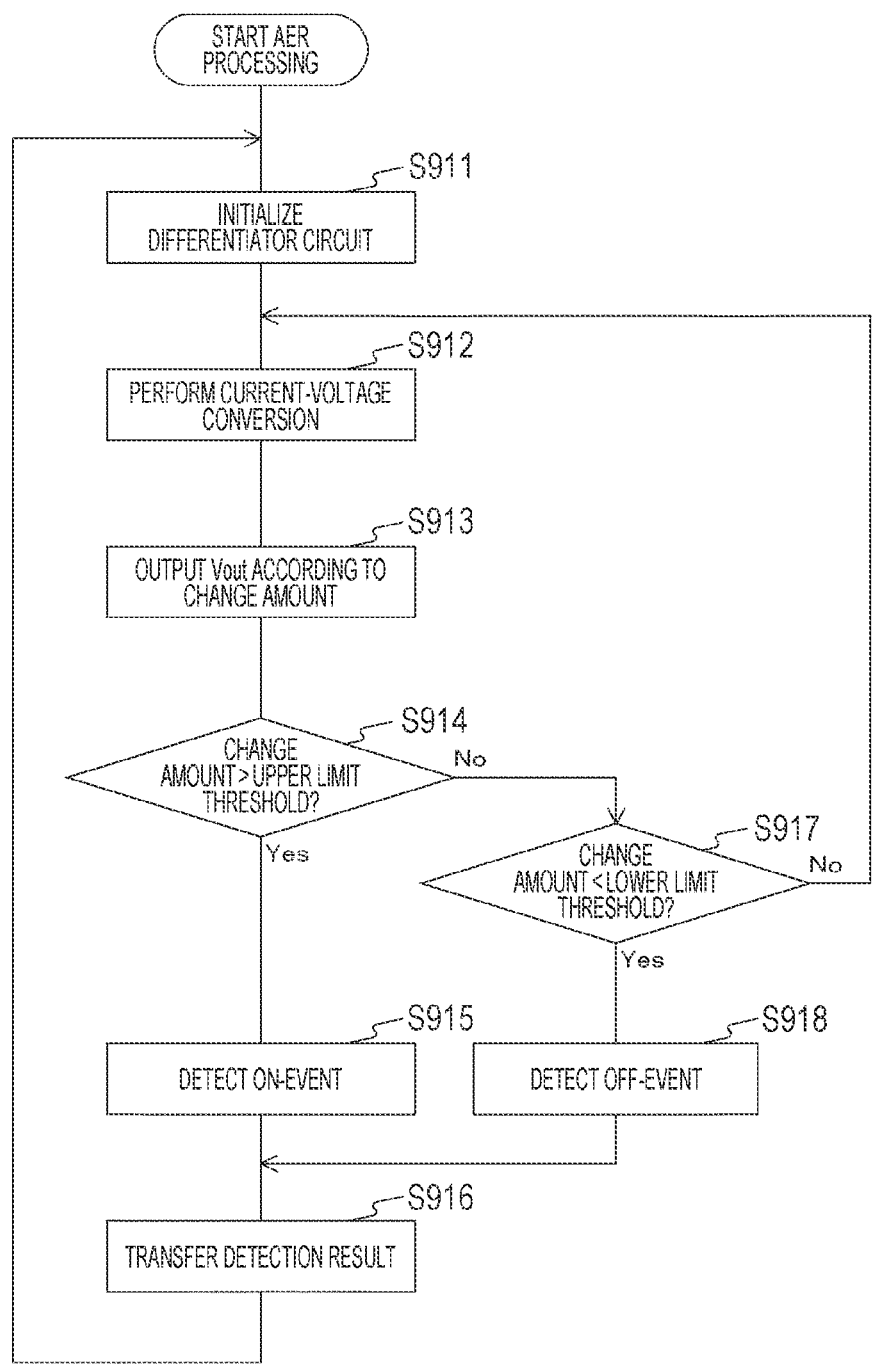
FIG. 12 is a flowchart illustrating an example of AER processing according to the first embodiment of the present technology.

FIG. 12 is a flowchart illustrating an example of address event representation (AER) processing according to the first embodiment of the present technology. This operation is started when, for example, a predetermined application for detecting an address event is executed.

The drive circuit 211 initializes the differentiator circuits 430 in all the address event detection pixels 400 (step S911). Then, the logarithmic response unit 410 converts the photocurrent into the pixel voltage Vp (step S912). The differentiator circuit 430 outputs a differential signal Vout according to the change amount of the pixel voltage Vp (step S913).

The comparator 440 determines whether or not the differential signal Vout (change amount) exceeds an upper limit threshold (step S914). In a case where the change amount exceeds the upper limit threshold (step S914: Yes), the address event detection pixel 400 detects an on-event (step S915).

In a case where the change amount is equal to or less than the upper limit threshold (step S914: No), the comparator 440 determines whether or not the change amount falls below the lower limit threshold (step S917). In a case where the change amount falls below the lower limit threshold (step S917: Yes), the address event detection pixel 400 detects an off-event (step S918).

In a case where the change amount is equal to or larger than the lower limit threshold (step S917: No), the address event detection pixel 400 repeats step S912 and the subsequent steps. Furthermore, after steps S915 and S916, the transfer unit 450 transfers the detection signal (step S916). After step S916, the solid-state image sensor 200 repeatedly executes step S911 and the subsequent steps. The second and subsequent initializations of the differentiator circuit 430 are executed by the transfer unit 450.

The imaging processing and AER processing illustrated in FIGS. 11 and 12 are performed in parallel, for example. Note that the solid-state image sensor 200 can also execute only one of the imaging processing and the AER processing.

As described above, according to the first embodiment of the present technology, the logarithmic response pixel 300 outputs the pixel signal while the address event detection pixel 400 outputs the detection signal. Therefore, detection of the presence or absence of the address event and image capture can be performed. In this configuration, one of the address event detection circuit 400 that outputs the detection signal and the logarithmic value readout circuit 330 that outputs the pixel signal is arranged in some pixels (such as in the address event detection pixels 400), and the other is arranged in the remaining pixels (such as the logarithmic response pixels 300). Thereby, the circuit scale per pixel can be reduced as compared with a case where both the address event detection circuit 400 and the logarithmic value readout circuit 330 are arranged for each pixel.

[First Modification]

In the first embodiment described above, the logarithmic response unit 310 including three transistors and a capacitance has been arranged for each pixel, but the circuit scale of the pixel array unit 214 increases as the number of pixels increases. The solid-state image sensor 200 according to a first modification of the first embodiment is different from that of the first embodiment in that the number of elements of the logarithmic response unit 310 is reduced.

Figure 13:
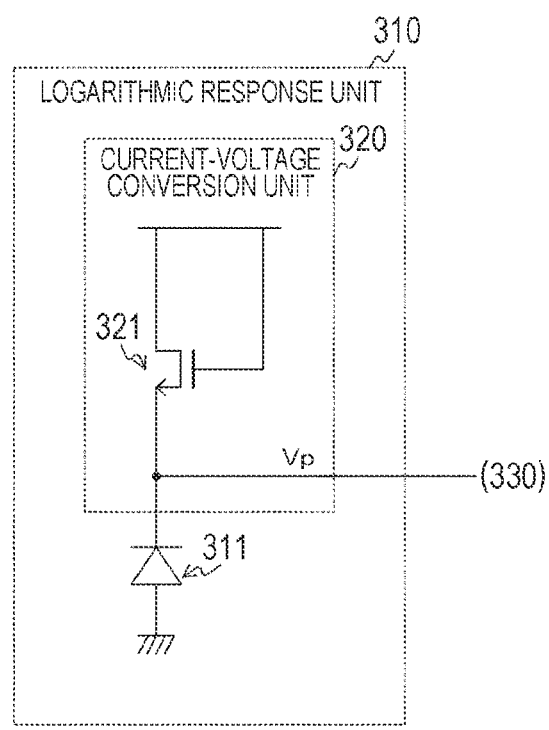
FIG. 13 is a circuit diagram illustrating a configuration example of a logarithmic response unit according to a first modification of the first embodiment of the present technology.

FIG. 13 is a circuit diagram illustrating a configuration example of the logarithmic response unit 310 according to the first modification of the first embodiment of the present technology. The logarithmic response unit 310 according to the first modification is different from that of the first embodiment in that only the N-type transistor 321 is arranged in the current-voltage conversion unit 320.

In FIG. 13, the drain and gate of the N-type transistor 321 are connected to the power supply terminal. Furthermore, a connection point of the N-type transistor 321 and the photoelectric conversion element 311 is connected to the logarithmic value readout circuit 330, and the voltage of the terminal is supplied as the pixel voltage Vp. With the configuration, the capacitance 322, the P-type transistor 323, and the N-type transistor 324 can be reduced. The configuration of the logarithmic response unit 410 in the address event detection pixel 400 is similar to that of the logarithmic response unit 310 in the logarithmic response pixel 300.

Note that, in the first embodiment, the pixel voltage Vp increases with the increase in the photocurrent according to the light amount, whereas in the modification of the first embodiment in FIG. 13, the pixel voltage Vp decreases with the increase in the photocurrent.

Figure 14:
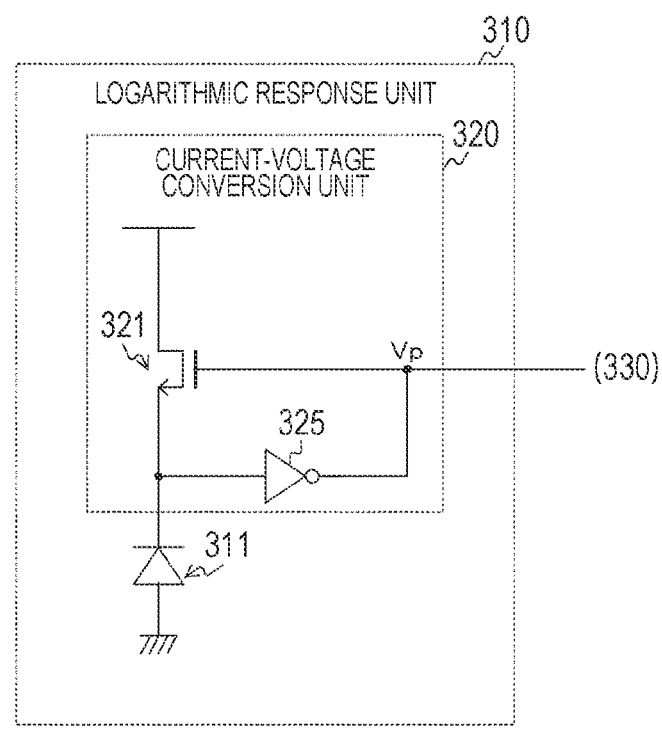
FIG. 14 is a circuit diagram illustrating a configuration example of the logarithmic response unit to which an inverter is added according to the first modification of the first embodiment of the present technology.

Note that to increase the pixel voltage Vp with the increase in the photocurrent, as in the first embodiment, an inverter 325 is simply added as illustrated in FIG. 14. In this configuration, when the inverter 325 is configured using N-type transistors and P-type transistors, the number of transistors is the same as that of the first embodiment, but the capacitance 322 can be reduced.

Figure 15:
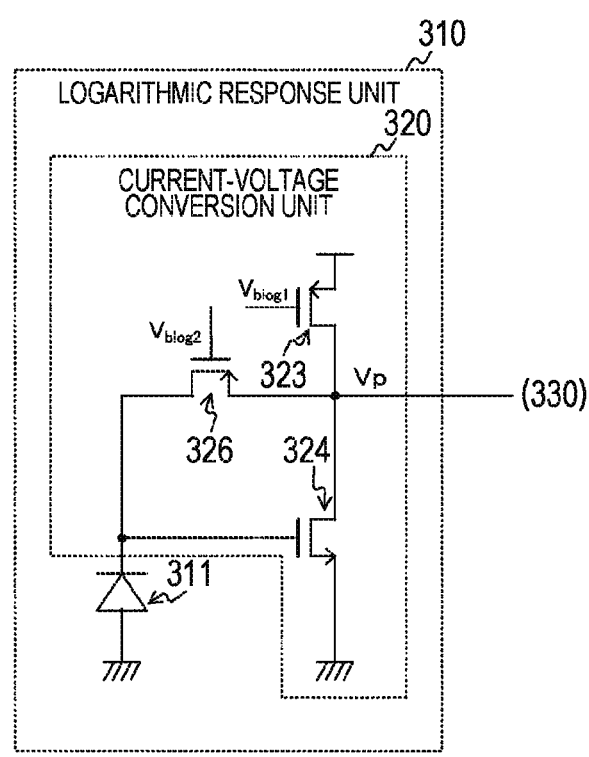
FIG. 15 is a circuit diagram illustrating a configuration example of the gate grounded-type logarithmic response unit according to the first modification of the first embodiment of the present technology.

Furthermore, as illustrated in FIG. 15, the capacitance 322 can be reduced and a P-type transistor 326 can be arranged instead of the N-type transistor 321. A MOS transistor is used as the P-type transistor, for example. The P-type transistor 326 is inserted between the photoelectric conversion element 311 and the connection point of the P-type transistor 323 and the N-type transistor 324. Furthermore, a bias voltage Vblog1 is applied to a gate of the P-type transistor 323, and a bias voltage Vblog2 is applied to a gate of the P-type transistor 326.

Note that the P-type transistor 323 is an example of a first P-type transistor described in the claims, and the P-type transistor 326 is an example of a second P-type transistor described in the claims.

Figure 16:
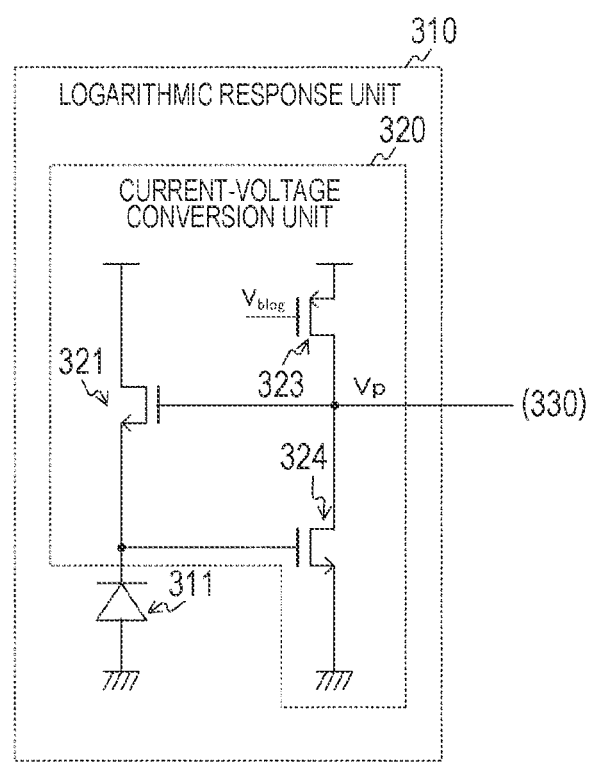
FIG. 16 is a circuit diagram illustrating a configuration example of the logarithmic response unit with a reduced capacitance according to the first modification of the first embodiment of the present technology.

Furthermore, as illustrated in FIG. 16, the N-type transistors 321 and 324 can be connected in a loop manner as in the first embodiment, and only the capacitance 322 can be reduced.

As described above, according to the first modification of the first embodiment of the present technology, the number of elements of the logarithmic response unit 310 is reduced for each pixel. Therefore, the circuit scale of the pixel array unit 214 can be reduced.

[Second Modification]

In the above-described first embodiment, the photocurrent has been converted into the voltage with the predetermined conversion gain, using the loop circuit including the N-type transistors 321 and 324 connected in a loop manner. However, the conversion gain may be insufficient only with the one-stage loop circuit. The logarithmic response unit 310 according to a second modification of the first embodiment is different from that of the first embodiment in that loop circuits are formed in two stages to improve the conversion gain.

Figure 17:
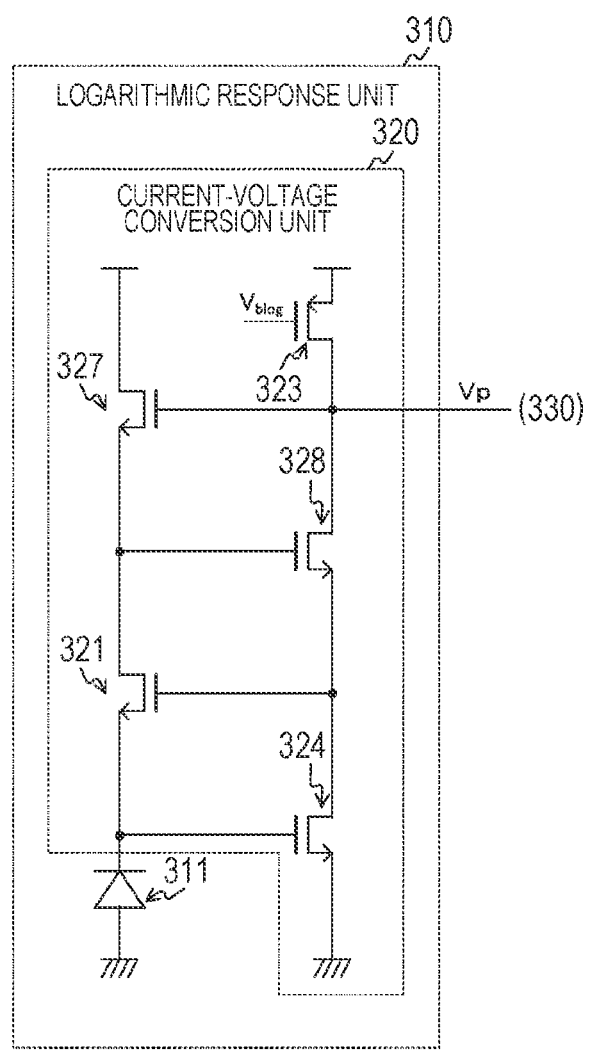
FIG. 17 is a circuit diagram illustrating a configuration example of the logarithmic response unit according to a second modification of the first embodiment of the present technology.

FIG. 17 is a circuit diagram illustrating a configuration example of the logarithmic response unit 310 according to the second modification of the first embodiment of the present technology. The logarithmic response unit 310 according to the second modification is different from that of the first embodiment in further providing N-type transistors 327 and 328 in the current-voltage conversion unit 320. A MOS transistor is used as the N-type transistors 327 and 328, for example.

The N-type transistors 321 and 327 are connected in series between the power supply terminal and the photoelectric conversion element 311. Meanwhile, the P-type transistor 323, and the N-type transistors 328 and 324 are connected in series between the power supply terminal and the reference terminal.

Furthermore, the gate of the N-type transistor 321 is connected to a connection point of the N-type transistors 324 and 328. A gate of the N-type transistor 327 is connected to a connection point of the P-type transistor 323 and the N-type transistor 328, and the pixel voltage Vp is output from the connection point. The gate of the N-type transistor 324 is connected to the connection point of the photoelectric conversion element 311 and the N-type transistor 321. A gate of the N-type transistor 328 is connected to a connection point of the N-type transistors 321 and 327.

With the above connection configuration, the two-stage loop circuits including the loop circuit of the N-type transistors 321 and 324 and the loop circuit of the N-type transistors 327 and 328 are configured. By forming the loop circuits in two stages, the conversion gain is improved as compared with the case of one stage.

As described above, according to the second modification of the first embodiment of the present technology, since the two-stage loop circuit is provided in the current-voltage conversion unit 320, the conversion gain can be improved as compared with the case where the one-stage loop circuit is provided.

[Third Modification]

In the above-described first embodiment, the same number of logarithmic response pixels 300 as the address event detection pixels 400 have been arranged, but the number of logarithmic response pixels 300 may become insufficient in a case where high-quality image data is required. The solid-state image sensor 200 according to a third modification of the first embodiment is different from that of the first embodiment in that the number of the logarithmic response pixel 300 is made larger than the number of the address event detection pixels 400.

Figure 18:
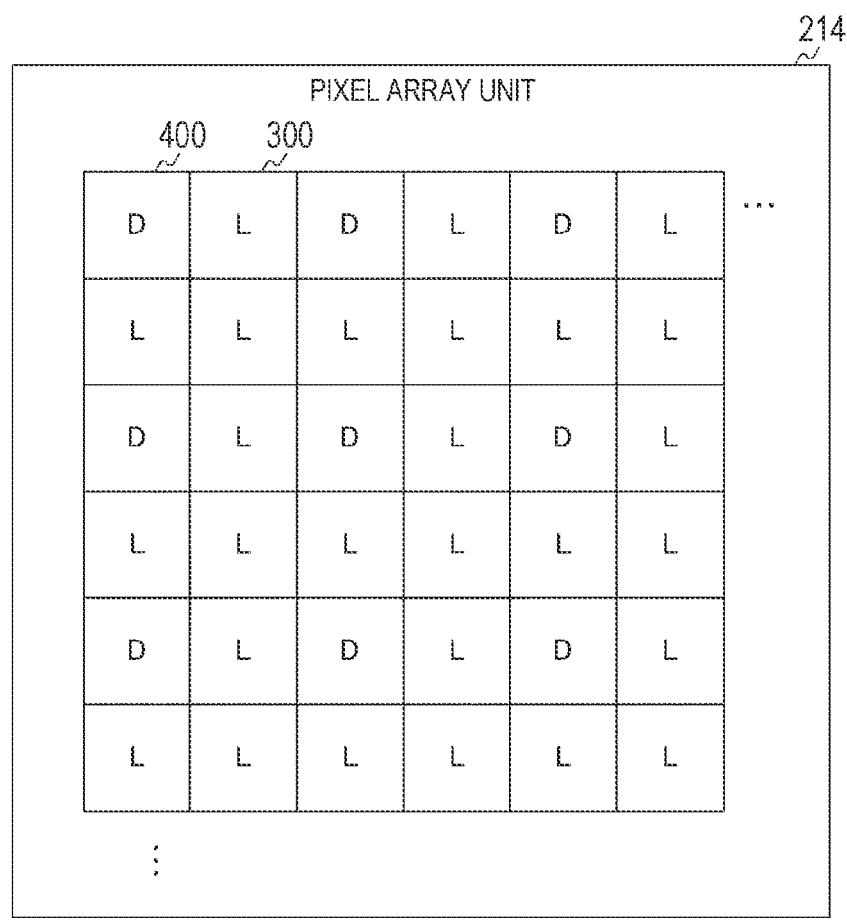
FIG. 18 is a plan view illustrating a configuration example of the pixel array unit according to a third modification of the first embodiment of the present technology.

FIG. 18 is a plan view illustrating a configuration example of the pixel array unit 214 according to the third modification of the first embodiment of the present technology. The pixel array unit 214 of the third modification is different from that of the first embodiment in that the number of logarithmic response pixels 300 is larger than the number of address event detection pixels 400. For example, 3×M logarithmic response pixels 300 are arranged where the number of address event detection pixels 400 is M (M is an integer). Furthermore, the address event detection pixels 400 are arranged every other pixel in the horizontal direction and the vertical direction. "D" in FIG. 18 represents the address event detection pixel 400 for implementing the DVS function. Furthermore, "L" represents the logarithmic response pixel 300.

Furthermore, for example, a red (R) pixel, a green (G) pixel, and a blue (B) pixel are arranged as the logarithmic response pixels 300 at coordinates of (x, y+1), (x+1, y), and (x+1, y+1), where coordinates of the address event detection pixel 400 are (x, y).

Figure 19:
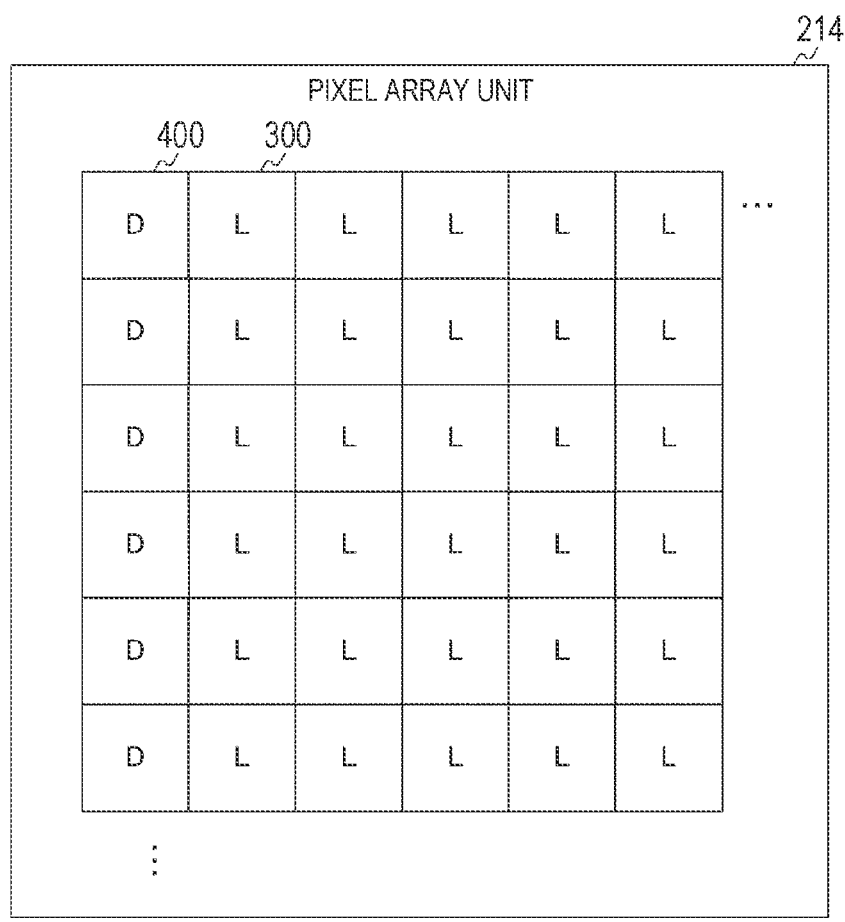
FIG. 19 is a plan view illustrating a configuration example of the pixel array unit in which address event detection pixels are arrayed in a column according to the third modification of the first embodiment of the present technology.

Note that the address event detection pixels 400 are arranged every other pixel in the horizontal direction and the vertical direction. However, the array pattern is not limited thereto as long as the number of logarithmic response pixels 300 is larger than the number of address event detection pixels 400. For example, as illustrated in FIG. 19, the address event detection pixels 400 can be arrayed in a column along the vertical direction, and the logarithmic response pixels 300 can be arrayed in a two-dimensional lattice manner. In FIG. 19, the number of columns of the address event detection pixels 400 is not limited to one column, and may be two or more columns. Furthermore, the address event detection pixels 400 can be arrayed along the horizontal direction.

Figure 20:
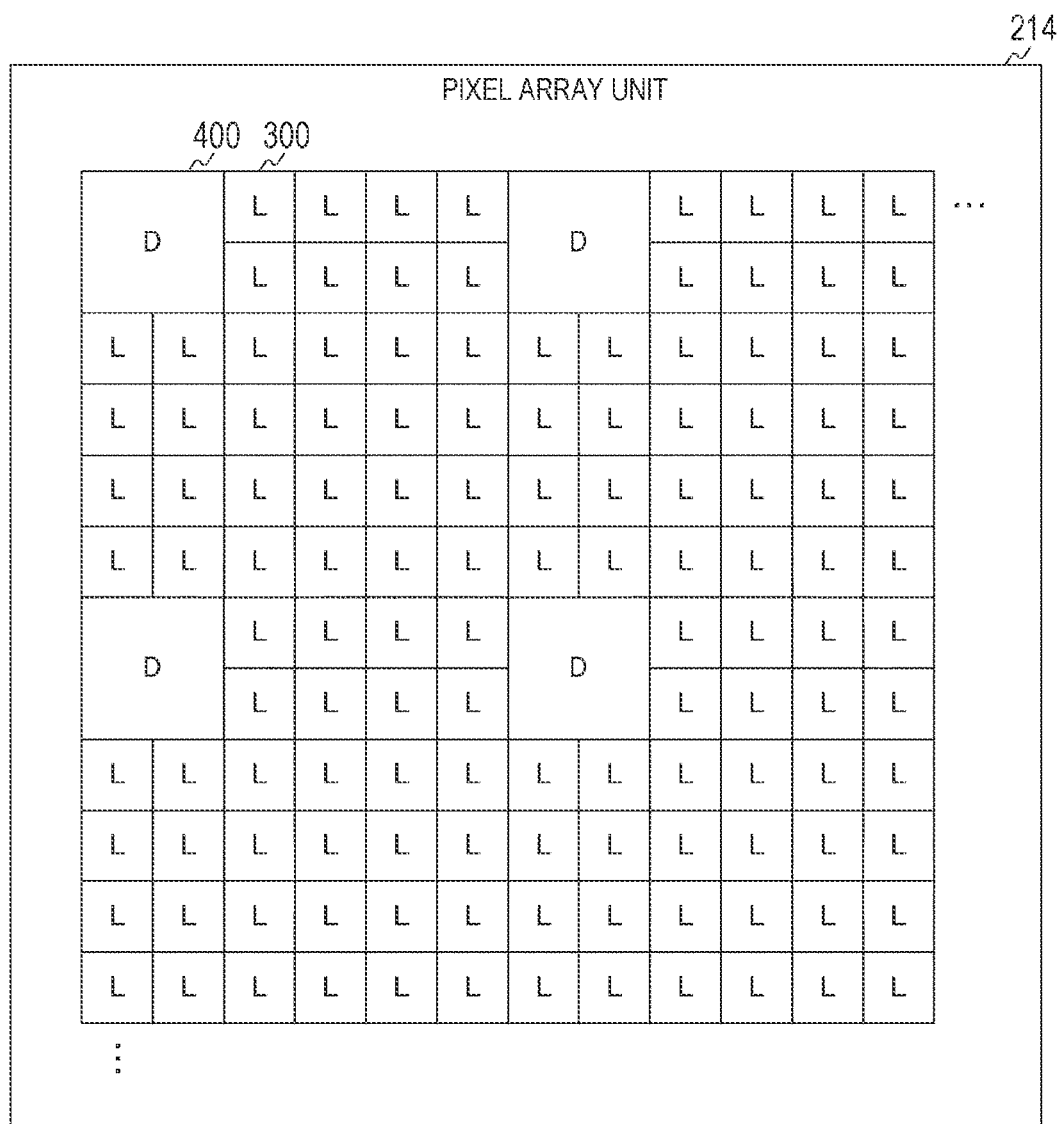
FIG. 20 is a plan view illustrating a configuration example of the pixel array unit in which sizes in a horizontal direction and a vertical direction of the address event detection pixel are made large according to the third modification of the first embodiment of the present technology.
Figure 21:
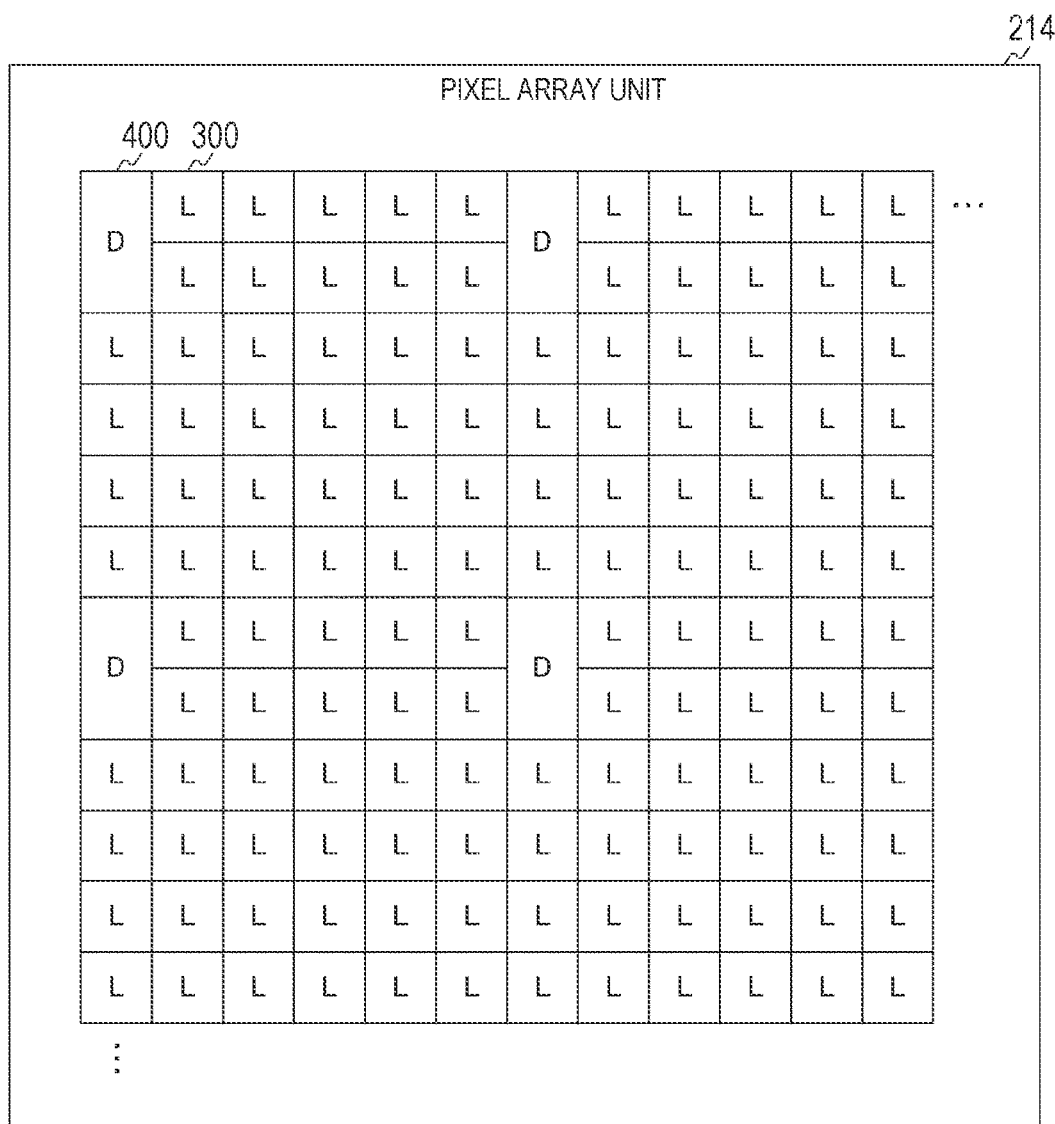
FIG. 21 is a plan view illustrating a configuration example of the pixel array unit in which the size in the vertical direction of the address event detection pixel is made large according to the third modification of the first embodiment of the present technology.

Furthermore, the pixel size of the address event detection pixel 400 is the same as that of the logarithmic response pixel 300, but the configuration is not limited thereto. Since the circuit scale of the address event detection pixel 400 is larger than that of the logarithmic response pixel 300, it is desirable to make the pixel size of the address event detection pixel 400 larger than that of the logarithmic response pixel 300. For example, as illustrated in FIG. 20, the pixel size of the address event detection pixel 400 can be made larger than that of the logarithmic response pixel 300 in the horizontal direction and vertical direction. Furthermore, as illustrated in FIG. 21, the pixel size of the address event detection pixel 400 can be made larger than that of the logarithmic response pixel 300 only in the vertical direction.

As described above, according to the third modification of the first embodiment of the present technology, the number of logarithmic response pixels 300 is made larger than the number of address event detection pixels 400. Therefore, the number of pixels of image data is larger than a case where the numbers of the logarithmic response pixels and address event detection pixels are the same, and the image quality can be improved.

2. Second Embodiment

In the above-described first embodiment, only the logarithmic response pixel 300 has generated the pixel signal according to the logarithmic value of the light amount. However, the number of pixel signals may become insufficient in a case where high-quality image data is required. A solid-state image sensor 200 according to a second embodiment is different from that of the first embodiment in that an address event detection pixel 400 generates a pixel signal in addition to a logarithmic response pixel 300.

Figure 22:
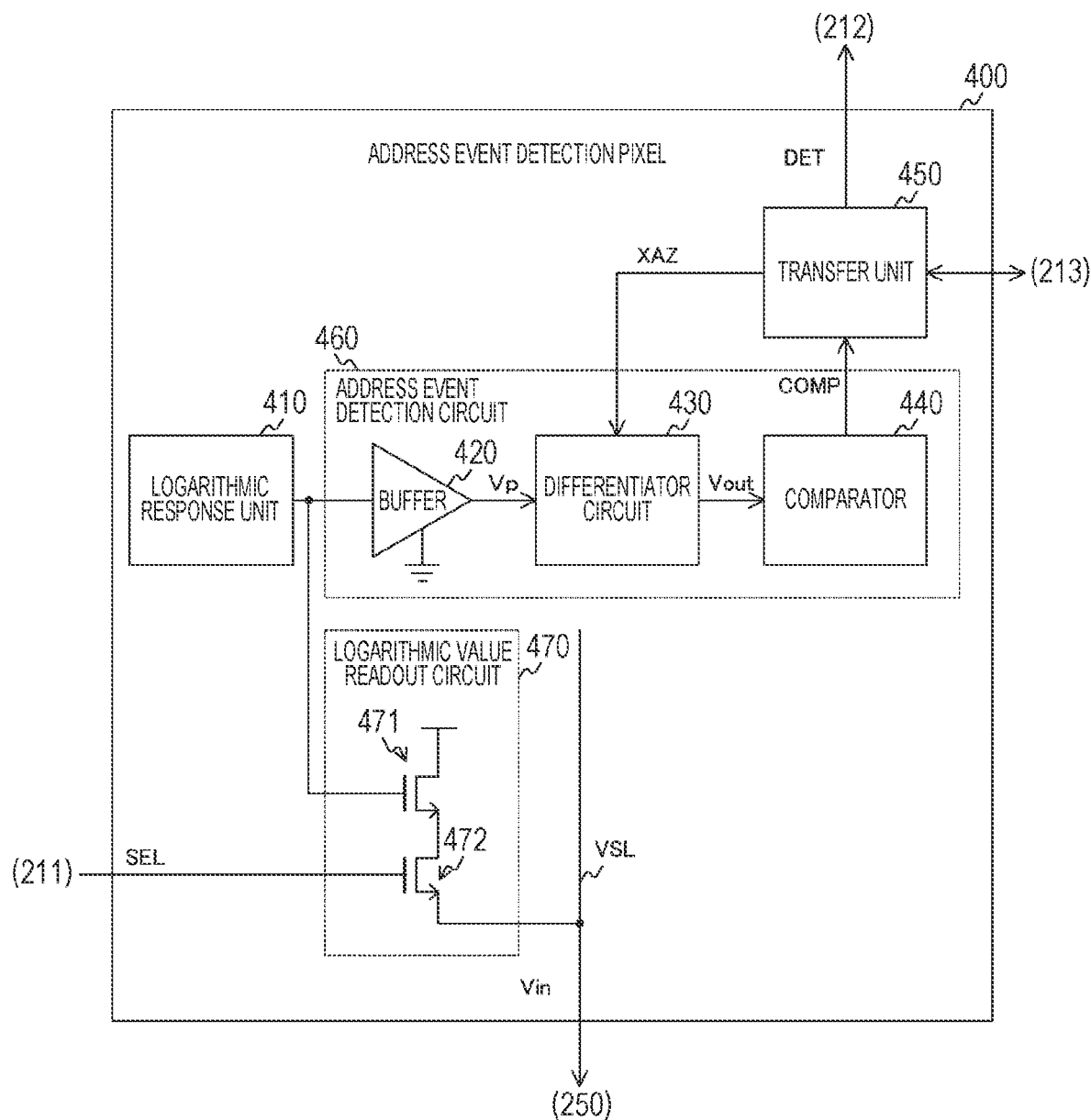
FIG. 22 is a block diagram illustrating a configuration example of an address event detection pixel according to a second embodiment of the present technology.

FIG. 22 is a block diagram illustrating a configuration example of the address event detection pixel 400 according to the second embodiment of the present technology. The address event detection pixel 400 of the second embodiment is different from that of the first embodiment in further including a logarithmic value readout circuit 470.

The logarithmic value readout circuit 470 is provided with an amplification transistor 471 and a selection transistor 472. The circuit configuration of the logarithmic value readout circuit 470 added in the address event detection pixel 400 is similar to that of the logarithmic value readout circuit 330 in the logarithmic response pixel 300. By adding the logarithmic value readout circuit 470, the address event detection pixel 400 can also generate a pixel signal corresponding to a logarithmic value of a light amount.

Note that each of the first to third modifications can be applied to the solid-state image sensor of the second embodiment.

As described above, according to the second embodiment of the present technology, the address event detection pixel 400 generates the pixel signal in addition to the logarithmic response pixel 300. Therefore, the number of pixel signals can be increased as compared with the case where only the logarithmic response pixel 300 generates the pixel signal. Thereby, the image quality of the image data can be improved.

3. Third Embodiment

In the above-described first embodiment, only the address event detection pixel 400 has detected the presence or absence of the address event and has generated the detection signal. However, the number of detection signals may become insufficient in a case where improvement of recognition accuracy of image recognition or the like is required. A solid-state image sensor 200 according to a third embodiment is different from that of the first embodiment in that a logarithmic response pixel 300 generates a detection signal in addition to an address event detection pixel 400.

Figure 23:
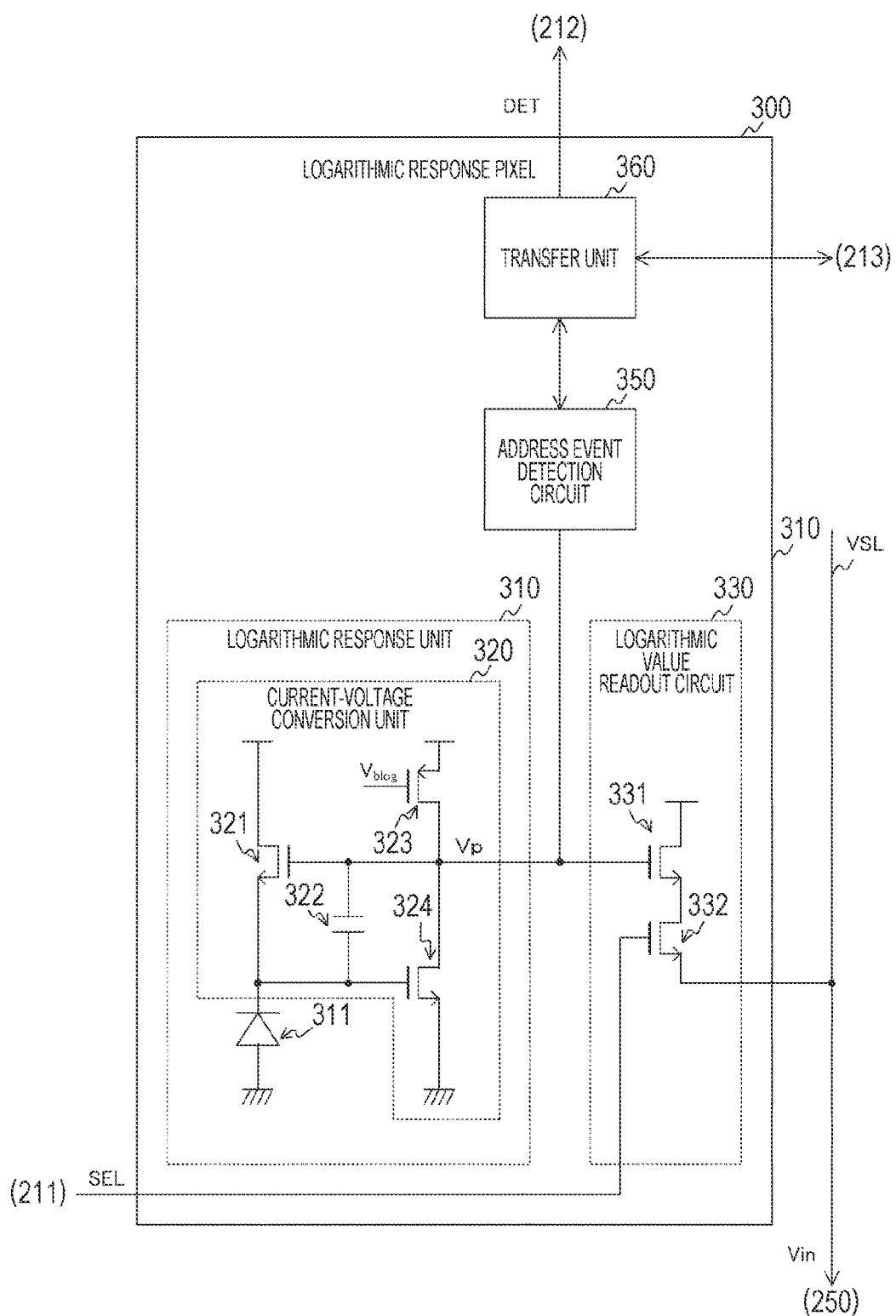
FIG. 23 is a block diagram illustrating a configuration example of a logarithmic response pixel according to a third embodiment of the present technology.

FIG. 23 is a block diagram illustrating a configuration example of the logarithmic response pixel 300 according to the third embodiment of the present technology. The logarithmic response pixel 300 of the third embodiment is different from that of the first embodiment in further including an address event detection circuit 350 and a transfer unit 360.

The configuration of the address event detection circuit 350 and the transfer unit 360 added in the logarithmic response pixel 300 is similar to that of the address event detection circuit 460 and the transfer unit 450 in the address event detection pixel 400. By adding the address event detection circuit 350 and the transfer unit 360, the logarithmic response pixel 300 can also detect the presence or absence of an address event and generate a detection signal.

Note that each of the first to third modifications can be applied to the solid-state image sensor of the third embodiment.

As described above, according to the third embodiment of the present technology, the logarithmic response pixel 300 generates the detection signal in addition to the address event detection pixel 400. Therefore, the number of detection signals can be increased as compared with the case where only the address event detection pixel 400 generates the detection signal. Thereby, the recognition accuracy of the image recognition and the like can be improved.

4. Fourth Embodiment

In the above-described first embodiment, only the address event detection pixel 400 has detected the presence or absence of the address event and has generated the detection signal. However, the number of detection signals may become insufficient in a case where improvement of recognition accuracy of image recognition or the like is required. A solid-state image sensor 200 according to a fourth embodiment is different from that of the first embodiment in that an address event detection circuit 460 is shared by an address event detection pixel 400 and a logarithmic response pixel 300.

Figure 24:
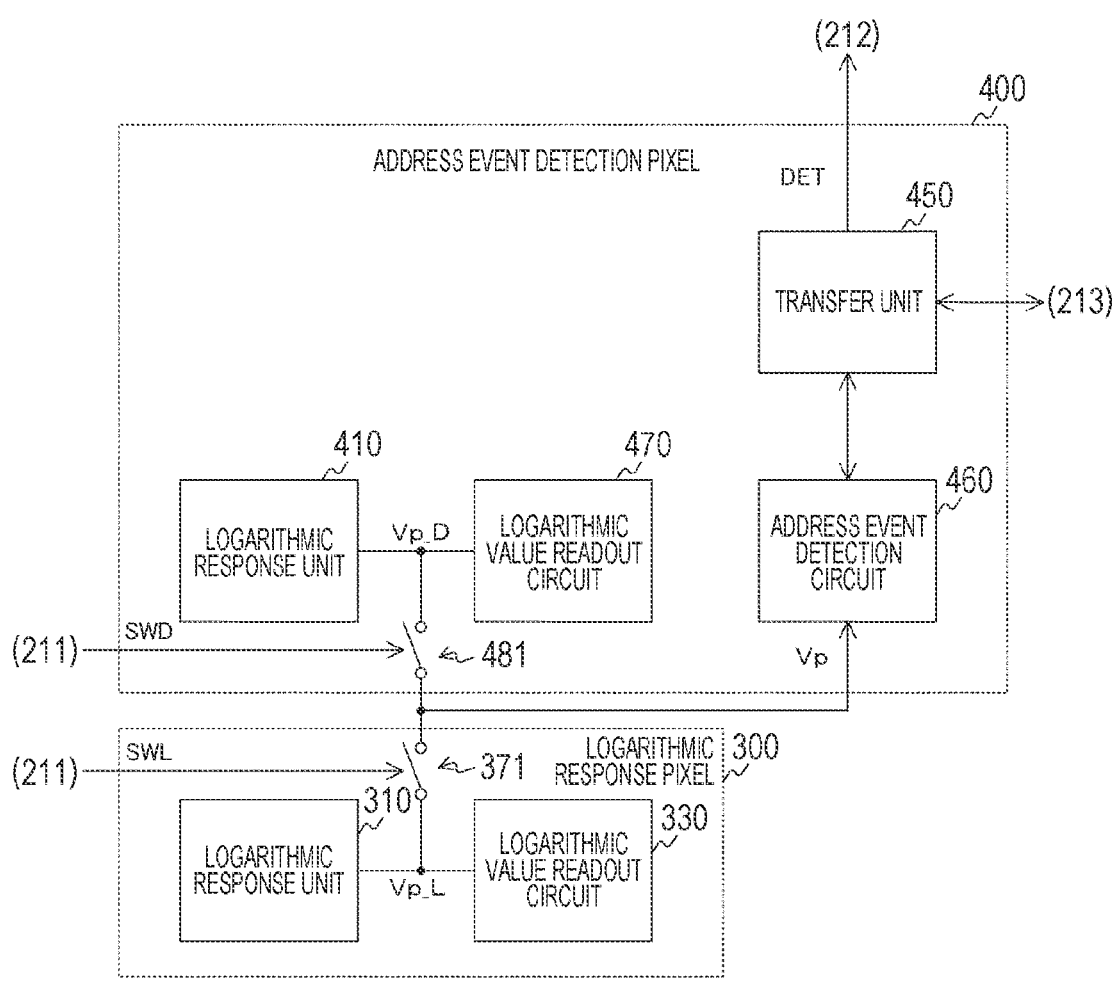
FIG. 24 is a block diagram illustrating a configuration example of an address event detection pixel and a logarithmic response pixel according to a fourth embodiment of the present technology.

FIG. 24 is a block diagram illustrating a configuration example of the address event detection pixel 400 and the logarithmic response pixel 300 according to the fourth embodiment of the present technology. The address event detection pixel 400 of the fourth embodiment is different from that of the first embodiment in that a switch 481 is further provided. Furthermore, the logarithmic response pixel 300 of the fourth embodiment is different from that of the first embodiment in that a switch 371 is further provided.

The switch 481 opens or closes a path between the output terminal of the logarithmic response unit 410 and the input terminal of the address event detection circuit 460 in the address event detection pixel 400 according to a switching signal SWD from the drive circuit 211. The switch 371 opens or closes a path between the output terminal of the logarithmic response unit 310 in the logarithmic response pixel 300 and the input terminal of the address event detection circuit 460 according to a switching signal SWL from the drive circuit 211.

The drive circuit 211 controls one of the switches 481 and 371 to be in an open state and the other to be in a close state by the switching signals SWD and SWL. Then, the drive circuit 211 switches the switch to be opened at regular intervals. As a result, the pixel voltage Vp of one of the address event detection pixel 400 and the logarithmic response pixel 300 is input to the address event detection circuit 460. Then, the address event detection circuit 460 compares the change amount of the pixel voltage Vp with a threshold to detect the presence or absence of an address event.

Note that each of the first to third modifications can be applied to the solid-state image sensor of the fourth embodiment.

As described above, according to the fourth embodiment of the present technology, since the address event detection pixel 400 and the logarithmic response pixel 300 share the address event detection circuit 460, the detection signal can be generated also from the pixel voltage Vp of the logarithmic response pixel 300. As a result, the number of detection signals can be increased as compared with the case where the detection signal is generated only from the pixel voltage Vp of the address event detection pixel 400, and the recognition accuracy of the image recognition and the like can be improved.

5. Applications to Moving Bodies

The technology according to the present disclosure (present technology) can be applied to various products. For example, the technology according to the present disclosure may be realized as a device mounted on any type of moving bodies including an automobile, an electric automobile, a hybrid electric automobile, a motorcycle, a bicycle, a personal mobility, an airplane, a drone, a ship, a robot, and the like.

Figure 25:
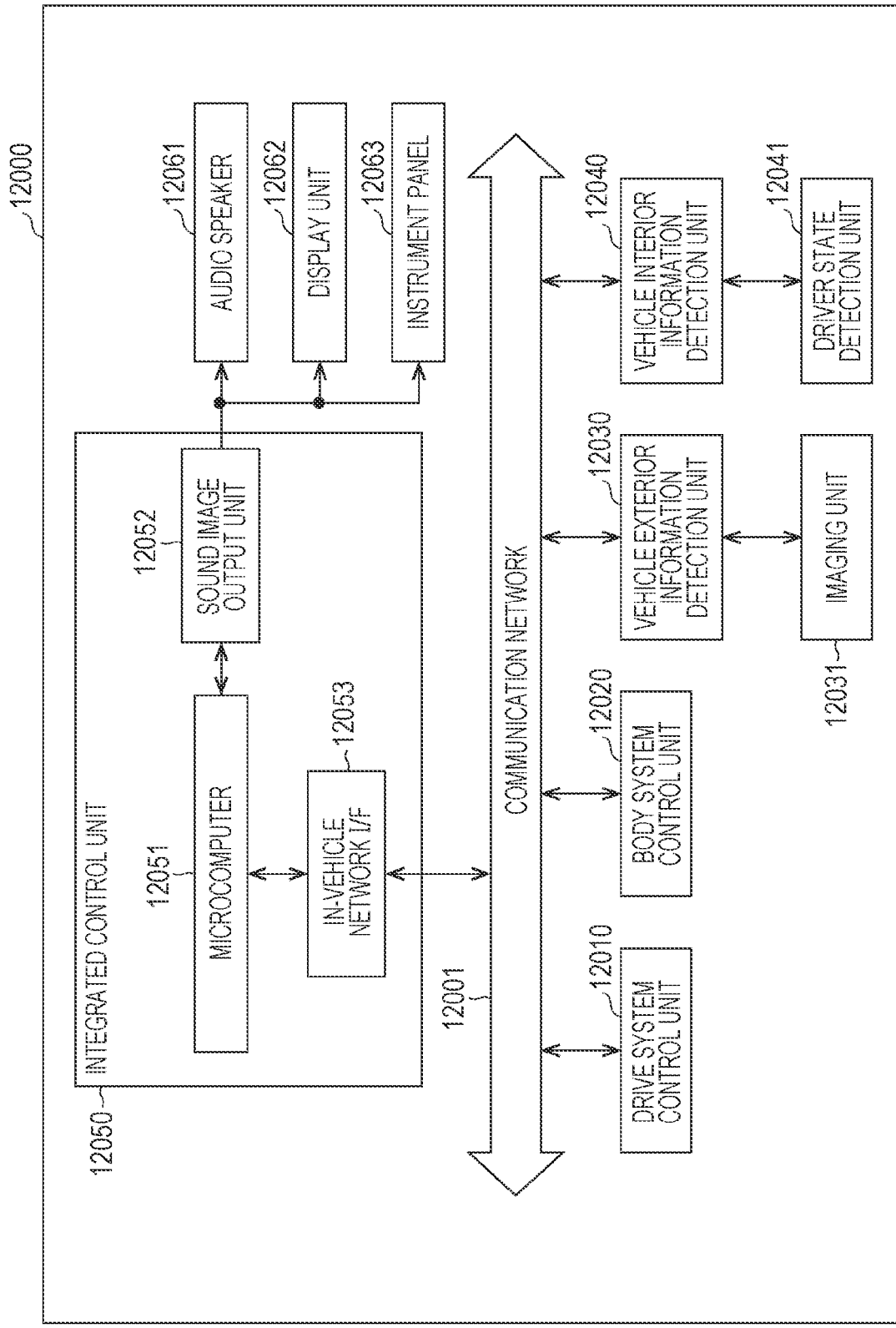
FIG. 25 is a block diagram illustrating an example of a schematic configuration of a vehicle control system.

FIG. 25 is a block diagram illustrating a schematic configuration example of a vehicle control system as an example of a moving body control system to which the technology according to the present disclosure is applicable.

A vehicle control system 12000 includes a plurality of electronic control units connected through a communication network 12001. In the example illustrated in FIG. 25, the vehicle control system 12000 includes a drive system control unit 12010, a body system control unit 12020, a vehicle exterior information detection unit 12030, a vehicle interior information detection unit 12040, and an integrated control unit 12050. Furthermore, as functional configurations of the integrated control unit 12050, a microcomputer 12051, a sound image output unit 12052, and an in-vehicle network interface (I/F) 12053 are illustrated.

The drive system control unit 12010 controls operations of devices regarding a drive system of a vehicle according to various programs. For example, the drive system control unit 12010 functions as a control device of a drive force generation device for generating drive force of a vehicle, such as an internal combustion engine or a drive motor, a drive force transmission mechanism for transmitting drive force to wheels, a steering mechanism that adjusts a steering angle of a vehicle, a braking device that generates braking force of a vehicle, and the like.

The body system control unit 12020 controls operations of various devices equipped in a vehicle body according to various programs. For example, the body system control unit 12020 functions as a control device of a keyless entry system, a smart key system, an automatic window device, and various lamps such as head lamps, back lamps, brake lamps, turn signals, and fog lamps. In this case, radio waves transmitted from a mobile device substituted for a key or signals of various switches can be input to the body system control unit 12020. The body system control unit 12020 receives an input of the radio waves or the signals, and controls a door lock device, the automatic window device, the lamps, and the like of the vehicle.

The vehicle exterior information detection unit 12030 detects information outside the vehicle that mounts the vehicle control system 12000. For example, an imaging unit 12031 is connected to the vehicle exterior information detection unit 12030. The vehicle exterior information detection unit 12030 causes the imaging unit 12031 to capture an image outside the vehicle, and receives the captured image. The vehicle exterior information detection unit 12030 may perform object detection processing or distance detection processing of persons, vehicles, obstacles, signs, letters on a road surface, or the like on the basis of the received image.

The imaging unit 12031 is an optical sensor that receives light and outputs an electrical signal according to a light-receiving amount of the light. The imaging unit 12031 can output the electrical signal as an image and can output the electrical signal as information of distance measurement. Furthermore, the light received by the imaging unit 12031 may be visible light or may be non-visible light such as infrared light.

The vehicle interior information detection unit 12040 detects information inside the vehicle. A driver state detection unit 12041 that detects a state of a driver is connected to the vehicle interior information detection unit 12040, for example. The driver state detection unit 12041 includes a camera that captures the driver, for example, and the vehicle interior information detection unit 12040 may calculate the degree of fatigue or the degree of concentration of the driver, or may determine whether or not the driver falls asleep on the basis of the detection information input from the driver state detection unit 12041.

The microcomputer 12051 calculates a control target value of the drive force generation device, the steering mechanism, or the braking device on the basis of the information outside and inside the vehicle acquired in the vehicle exterior information detection unit 12030 or the vehicle interior information detection unit 12040, and can output a control command to the drive system control unit 12010. For example, the microcomputer 12051 can perform cooperative control for the purpose of realization of an advanced driver assistance system (ADAS) function including collision avoidance or shock mitigation of the vehicle, following travel based on an inter-vehicle distance, vehicle speed maintaining travel, collision warning of the vehicle, lane out warning of the vehicle, and the like.

Furthermore, the microcomputer 12051 controls the drive force generation device, the steering mechanism, the braking device, or the like on the basis of the information of a vicinity of the vehicle acquired in the vehicle exterior information detection unit 12030 or the vehicle interior information detection unit 12040 to perform cooperative control for the purpose of automatic drive of autonomous travel without depending on an operation of the driver or the like.

Furthermore, the microcomputer 12051 can output a control command to the body system control unit 12020 on the basis of the information outside the vehicle acquired in the vehicle exterior information detection unit 12030. For example, the microcomputer 12051 can perform cooperative control for the purpose of achievement of non-glare such as by controlling the head lamps according to the position of a leading vehicle or an oncoming vehicle detected in the vehicle exterior information detection unit 12030, and switching high beam light to low beam light.

The sound image output unit 12052 transmits an output signal of at least one of a sound or an image to an output device that can visually and aurally notify a passenger of the vehicle or an outside of the vehicle of information. In the example in FIG. 25, as the output device, an audio speaker 12061, a display unit 12062, and an instrument panel 12063 are exemplarily illustrated. The display unit 12062 may include, for example, at least one of an on-board display or a head-up display.

Figure 26:
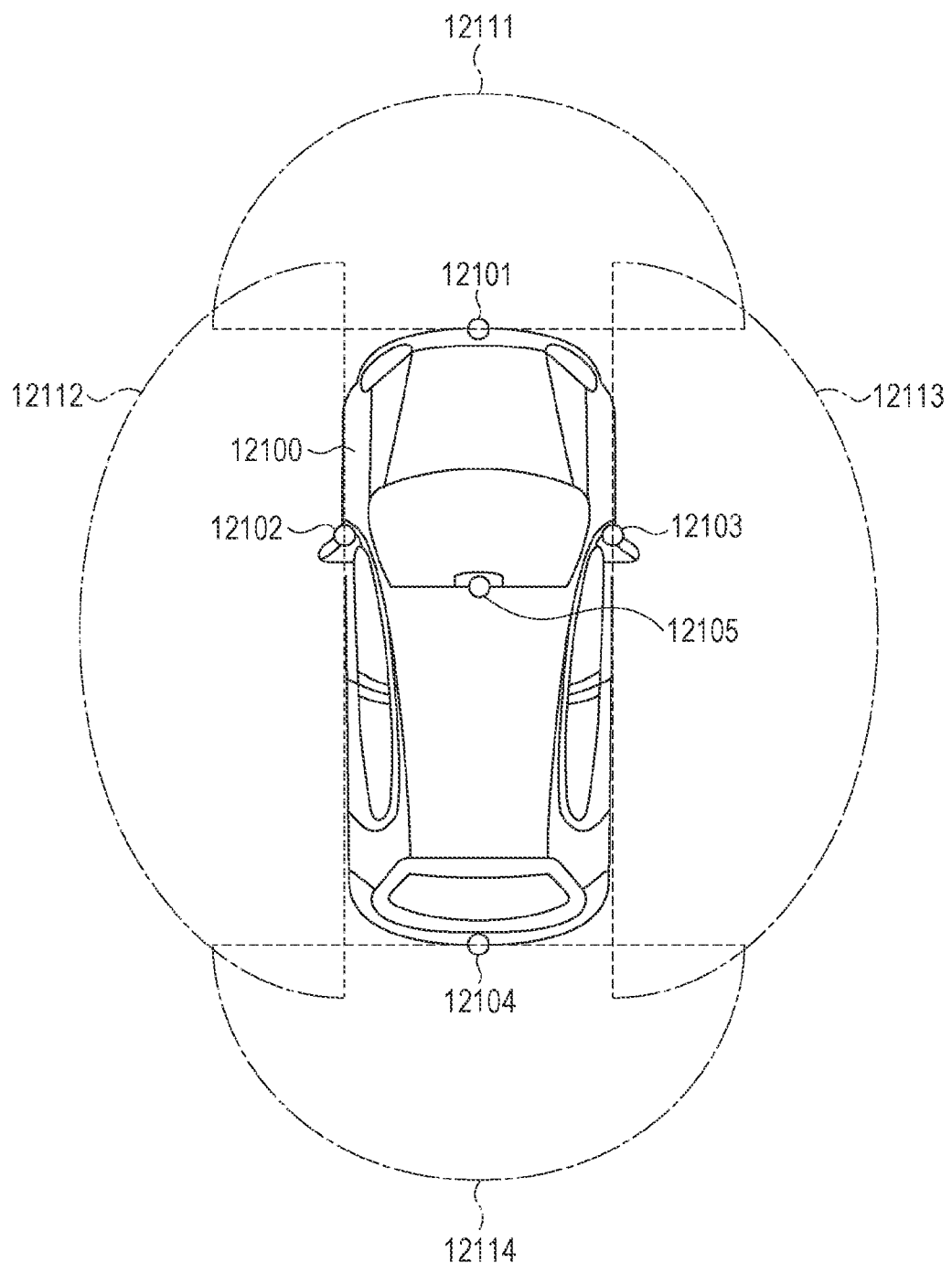
FIG. 26 is an explanatory diagram illustrating an example of installation positions of a vehicle exterior information detection unit and an imaging unit.

FIG. 26 is a diagram illustrating an example of an installation position of the imaging unit 12031.

In FIG. 26, imaging units 12101, 12102, 12103, 12104, and 12105 are included as the imaging unit 12031.

The imaging units 12101, 12102, 12103, 12104, and 12105 are provided at positions of a front nose, side mirrors, a rear bumper, a back door, an upper portion of a windshield, and the like in an interior of a vehicle 12100, for example.

The imaging unit 12101 provided at the front nose and the imaging unit 12105 provided at an upper portion of the windshield in an interior of the vehicle mainly acquire images in front of the vehicle 12100. The imaging units 12102 and 12103 provided at the side mirrors mainly acquire images on sides of the vehicle 12100. The imaging unit 12104 provided at the rear bumper or the back door mainly acquires images in back of the vehicle 12100. The imaging unit 12105 provided at the upper portion of the windshield in the interior of the vehicle is mainly used for detecting a leading vehicle, a pedestrian, an obstacle, a traffic signal, a traffic sign, a lane, or the like.

Note that FIG. 26 illustrates an example of capture ranges of the imaging units 12101 to 12104. An imaging range 12111 indicates the imaging range of the imaging unit 12101 provided at the front nose, imaging ranges 12112 and 12113 respectively indicate the imaging ranges of the imaging units 12102 and 12103 provided at the side mirrors, and an imaging range 12114 indicates the imaging range of the imaging unit 12104 provided at the rear bumper or the back door. For example, a bird's-eye view image of the vehicle 12100 as viewed from above can be obtained by superimposing image data captured by the imaging units 12101 to 12104.

At least one of the imaging units 12101 to 12104 may have a function to acquire distance information. For example, at least one of the imaging units 12101 to 12104 may be a stereo camera including a plurality of image sensors or may be an image sensor having pixels for phase difference detection.

For example, the microcomputer 12051 obtains distances to three-dimensional objects in the imaging ranges 12111 to 12114 and temporal change of the distances (relative speeds to the vehicle 12100) on the basis of the distance information obtained from the imaging units 12101 to 12104, thereby to extract particularly a three-dimensional object closest to the vehicle 12100 on a traveling road and traveling at a predetermined speed (for example, 0 km/h or more) in substantially the same direction as the vehicle 12100 as a leading vehicle. Moreover, the microcomputer 12051 can set an inter-vehicle distance to be secured from the leading vehicle in advance and perform automatic braking control (including following stop control) and automatic acceleration control (including following start control), and the like. In this way, the cooperative control for the purpose of automatic drive of autonomous travel without depending on an operation of the driver, and the like can be performed.

For example, the microcomputer 12051 classifies three-dimensional object data regarding three-dimensional objects into two-wheeled vehicles, ordinary cars, large vehicles, pedestrians, and other three-dimensional objects such as electric poles to be extracted, on the basis of the distance information obtained from the imaging units 12101 to 12104, and can use the data for automatic avoidance of obstacles. For example, the microcomputer 12051 discriminates obstacles around the vehicle 12100 into obstacles visually recognizable by the driver of the vehicle 12100 and obstacles visually unrecognizable by the driver. The microcomputer 12051 then determines a collision risk indicating a risk of collision with each of the obstacles, and can perform drive assist for collision avoidance by outputting warning to the driver through the audio speaker 12061 or the display unit 12062, and performing forced deceleration or avoidance steering through the drive system control unit 12010, in a case where the collision risk is a set value or more and there is a collision possibility.

At least one of the imaging units 12101 to 12104 may be an infrared camera that detects infrared light. For example, the microcomputer 12051 determines whether or not a pedestrian exists in the captured images of the imaging units 12101 to 12104, thereby to recognize the pedestrian. Such recognition of a pedestrian is performed by a process of extracting characteristic points in the captured images of the imaging units 12101 to 12104, as the infrared camera, for example, and by a process of performing pattern matching processing for the series of characteristic points indicating a contour of an object and determining whether or not the object is a pedestrian. When the microcomputer 12051 determines that a pedestrian exists in the captured images of the imaging units 12101 to 12104 and recognizes the pedestrian, the sound image output unit 12052 causes the display unit 12062 to superimpose and display a square contour line for emphasis on the recognized pedestrian. Furthermore, the sound image output unit 12052 may cause the display unit 12062 to display an icon or the like representing the pedestrian at a desired position.

An example of a vehicle control system to which the technology according to the present disclosure is applicable has been described. The technology according to the present disclosure is applicable to the imaging unit 12031, of the above-described configurations. Specifically, the imaging device 100 in FIG. 1 can be applied to the imaging unit 12031. By applying the technology according to the present disclosure to the imaging unit 12031, high-quality image data can be captured while detecting an address event.

Note that the above-described embodiments describe an example for embodying the present technology, and the matters in the embodiments and the matters used to specify the invention in the claims have corresponding relationships with each other. Similarly, the matters used to specify the invention in the claims and the matters in the embodiment of the present technology given the same names have corresponding relationships with each other. However, the present technology is not limited to the embodiments, and can be embodied by application of various modifications to the embodiments without departing from the gist of the present technology.

Furthermore, the processing procedures described in the above embodiments may be regarded as a method having these series of procedures, and also regarded as a program for causing a computer to execute these series of procedures and as a recording medium for storing the program. As this recording medium, for example, a compact disc (CD), a MiniDisc (MD), a digital versatile disc (DVD), a memory card, a Blu-ray (registered trademark) disc, or the like can be used.

Note that the effects described in the present specification are merely examples and are not limited, and other effects may be exhibited.

Note that the present technology can also have the following configurations.

(1) A solid-state image sensor including:

a pixel array unit in which a logarithmic response pixel that outputs an analog signal proportional to a logarithmic value of an incident light amount and a detection pixel that detects whether or not a change amount of the incident light amount has exceeded a predetermined threshold and outputs a detection signal indicating a detection result are arrayed; and a drive circuit configured to drive the logarithmic response pixel and the detection pixel and output the analog signal and the detection signal.

(2) The solid-state image sensor according to (1), in which
the logarithmic response pixel includes
a photoelectric conversion element configured to generate a photocurrent by photoelectric conversion,
a current-voltage conversion unit configured to convert the photocurrent into a voltage proportional to a logarithmic value of the photocurrent, and
a logarithmic value readout circuit configured to amplify the voltage and output the amplified voltage as the analog signal.

(3) The solid-state image sensor according to (2), in which
the current-voltage conversion unit includes an N-type transistor having a source connected to the photoelectric conversion element, and a gate and a drain connected to a predetermined power supply terminal, and
a connection point of the photoelectric conversion element and the N-type transistor is connected to the logarithmic value readout circuit.

(4) The solid-state image sensor according to (2), in which
the current-voltage conversion unit includes
an N-type transistor having a gate connected to the logarithmic value readout circuit, a source connected to the photoelectric conversion element, and a drain connected to a predetermined power supply terminal, and
an inverter configured to invert a potential of a connection point of the N-type transistor and the photoelectric conversion element and output the inverted potential to the gate.

(5) The solid-state image sensor according to (2), in which
the current-voltage conversion unit includes
an N-type transistor and a first P-type transistor connected in series between a power supply terminal and a reference terminal, and
a second P-type transistor inserted between a connection point of the N-type transistor and the first P-type transistor and the photoelectric conversion element.

(6) The solid-state image sensor according to (2), in which
the current-voltage conversion unit is provided with two-stage loop circuits, and
each of the loop circuits includes a pair of N-type transistors connected in a loop manner.

(7) The solid-state image sensor according to (2), in which
the current-voltage conversion unit includes
a first N-type transistor having a gate connected to the logarithmic value readout circuit, a source connected to the photoelectric conversion element, and a drain connected to a predetermined power supply terminal,
a second N-type transistor having a gate connected to a connection point of the first N-type transistor and the photoelectric conversion element, and a drain connected to a predetermined reference terminal, and
a P-type transistor inserted between the second N-type transistor and the power supply terminal.

(8) The solid-state image sensor according to (7), in which
the current-voltage conversion unit further includes a capacitance inserted between the gate of the first N-type transistor and the gate of the second N-type transistor.

(9) The solid-state image sensor according to any one of (1) to (8), in which
a predetermined number of the detection pixels and the predetermined number of the logarithmic response pixels are arrayed in the pixel array unit.

(10) The solid-state image sensor according to any one of (1) to (8), in which
a predetermined number of the detection pixels and a number of the logarithmic response pixels, the number being larger than the predetermined number, are arrayed in the pixel array unit.

(11) The solid-state image sensor according to (10), in which
the detection pixels are arrayed every other pixel in a predetermined direction and a direction perpendicular to the predetermined direction.

(12) The solid-state image sensor according to (10), in which
the logarithmic response pixels are arrayed in a two-dimensional lattice manner, and
the detection pixels are arrayed along a predetermined direction.

(13) The solid-state image sensor according to any one of (10) to (12), in which
the detection pixel is larger than the logarithmic response pixel in size.

(14) The solid-state image sensor according to any one of (1) to (13), in which
the detection pixel further outputs an analog signal proportional to the logarithmic value of the light amount.

(15) The solid-state image sensor according to any one of (1) to (13), in which
the logarithmic response pixel detects whether or not the change amount of the light amount has exceeded the predetermined threshold, and further outputs a detection signal indicating a detection result.

(16) The solid-state image sensor according to any one of (1) to (13), in which
the logarithmic response pixel includes
a first logarithmic response unit configured to convert a photocurrent into a first voltage proportional to a logarithmic value of the photocurrent, and
a first logarithmic value readout circuit configured to amplify the first voltage and output the amplified first voltage as the analog signal, and
the detection pixel includes
a second logarithmic response unit configured to convert a photocurrent into a second voltage proportional to a logarithmic value of the photocurrent, and
a detection circuit configured to detect whether or not a change amount of one of the first and second voltages has exceeded the threshold, and output the detection signal.

(17) An imaging device including:
a pixel array unit in which a logarithmic response pixel that outputs an analog signal proportional to a logarithmic value of an incident light amount and a detection pixel that detects whether or not a change amount of the incident light amount has exceeded a predetermined threshold and outputs a detection signal indicating a detection result are arrayed;
a drive circuit configured to drive the logarithmic response pixel and the detection pixel and output the analog signal and the detection signal; and
an analog-digital conversion unit configured to convert the analog signal into a digital signal.

REFERENCE SIGNS LIST

100 Imaging device
110 Imaging lens
120 Recording unit
130 Control unit
200 Solid-state image sensor
201 Light-receiving chip
201 Circuit chip
211 Drive circuit
212 Detection signal processing unit
213 Arbiter
214 Pixel array unit 250 Column signal processing unit
251 AD converter
252 Memory
253 Output unit
254 Digital calculation unit
255 Interface unit
300 Logarithmic response pixel
310 Logarithmic response unit
311, 411 Photoelectric conversion element
320, 416 Current-voltage conversion unit
321, 324, 327, 328, 412, 415, 435, 442, 444 N-type transistor
322, 413, 431, 434 Capacitance
323, 326, 414, 421, 422, 432, 433, 441, 443 P-type transistor
325 Inverter
330, 470 Logarithmic value readout circuit
331, 471 Amplification transistor
332, 472 Selection transistor
350, 460 Address event detection circuit
360, 450 Transfer unit
371, 481 Switch
400 Address event detection pixel
410 Logarithmic response unit
420 Buffer
430 Differentiator circuit
440 Comparator
12031 Imaging unit

The invention claimed is:

1. A solid-state image sensor, comprising:
a pixel array unit that includes a logarithmic response pixel and a detection pixel, wherein
the logarithmic response pixel is configured to output an analog signal proportional to a logarithmic value of an incident light amount,
the logarithmic response pixel includes:
a photoelectric conversion element configured to generate a first photocurrent based on photoelectric conversion;
first circuitry configured to convert the first photocurrent into a first voltage proportional to a logarithmic value of the first photocurrent; and
a logarithmic value readout circuit configured to amplify the first voltage and output the amplified first voltage as the analog signal,
the first circuitry includes:
an N-type transistor and a first P-type transistor connected in series between a power supply terminal and a reference terminal; and
a second P-type transistor inserted between a connection point of the N-type transistor and the first P-type transistor and the photoelectric conversion element, and
the detection pixel is configured to:
detect whether a change amount of the incident light amount exceeds a threshold value; and
output a detection signal that indicates a result of the detection; and
a drive circuit configured to:
drive the logarithmic response pixel and the detection pixel; and
output the analog signal and the detection signal.

2. The solid-state image sensor according to claim 1, wherein
a source of the N-type transistor is connected to the photoelectric conversion element,
a gate and a drain of the N-type transistor are connected to the power supply terminal, and
a connection point of the photoelectric conversion element and the N-type transistor is connected to the logarithmic value readout circuit.

3. The solid-state image sensor according to claim 1, wherein
a gate of the N-type transistor is connected to the logarithmic value readout circuit,
a source of the N-type transistor is connected to the photoelectric conversion element,
a drain of the N-type transistor is connected to the power supply terminal, and
the first circuitry further includes an inverter configured to:
invert a potential of a connection point of the N-type transistor and the photoelectric conversion element; and
output the inverted potential to the gate.

4. The solid-state image sensor according to claim 1, wherein
the first circuitry further includes two-stage loop circuits, and
each of the two-stage loop circuits includes a pair of N-type transistors connected in a loop manner.

5. The solid-state image sensor according to claim 1, wherein a first number of detection pixels and a second number of logarithmic response pixels are arrayed in the pixel array unit.

6. The solid-state image sensor according to claim 5, wherein the second number of logarithmic response pixels is larger than the first number of detection pixels.

7. The solid-state image sensor according to claim 6, wherein the detection pixels are arrayed every other pixel in a specific direction and a direction perpendicular to the specific direction.

8. The solid-state image sensor according to claim 6, wherein the logarithmic response pixels are arrayed in a two-dimensional lattice manner, and the detection pixels are arrayed along a specific direction.

9. The solid-state image sensor according to claim 1, wherein the detection pixel is larger than the logarithmic response pixel in size.

10. The solid-state image sensor according to claim 1, wherein the detection pixel is further configured to output the analog signal proportional to the logarithmic value of the incident light amount.

11. The solid-state image sensor according to claim 1, wherein the logarithmic response pixel is further configured to:
detect whether the change amount of the incident light amount exceeds the threshold value; and
output the detection signal that indicates the result of the detection.

12. The solid-state image sensor according to claim 1, wherein
the logarithmic response pixel further includes second circuitry configured to convert a second photocurrent into a second voltage proportional to a logarithmic value of the second photocurrent,
the first circuitry is further configured to amplify the second voltage and output the amplified second voltage as the analog signal, and
the detection pixel includes:
third circuitry configured to convert a third photocurrent into a third voltage proportional to a logarithmic value of the third photocurrent; and
a second detection circuit configured to detect whether a change amount of one of the first voltage or the second voltage exceeds the threshold value, and output the detection signal.

13. An imaging device, comprising:

a pixel array unit that includes a logarithmic response pixel and a detection pixel, wherein
the logarithmic response pixel is configured to output an analog signal proportional to a logarithmic value of an incident light amount,
the logarithmic response pixel includes:
a photoelectric conversion element configured to generate a photocurrent based on photoelectric conversion;
circuitry configured to convert the photocurrent into a voltage proportional to a logarithmic value of the photocurrent; and
a logarithmic value readout circuit configured to amplify the voltage and output the amplified voltage as the analog signal,
the circuitry includes:
an N-type transistor and a first P-type transistor connected in series between a power supply terminal and a reference terminal; and
a second P-type transistor inserted between a connection point of the N-type transistor and the first P-type transistor and the photoelectric conversion element, and
the detection pixel is configured to:
detect whether a change amount of the incident light amount exceeds a threshold value; and
output a detection signal that indicates a result of the detection;
a drive circuit configured to:
drive the logarithmic response pixel and the detection pixel; and
output the analog signal and the detection signal; and
an analog-digital conversion unit configured to convert the analog signal into a digital signal.

14. A solid-state image sensor, comprising:

a pixel array unit that includes a logarithmic response pixel and a detection pixel, wherein
the logarithmic response pixel is configured to output an analog signal proportional to a logarithmic value of an incident light amount,
the logarithmic response pixel includes:
a photoelectric conversion element configured to generate a first photocurrent based on photoelectric conversion;
circuitry configured to convert the first photocurrent into a voltage proportional to a logarithmic value of the first photocurrent; and
a logarithmic value readout circuit configured to amplify the voltage and output the amplified voltage as the analog signal,
the circuitry includes:
a first N-type transistor having a gate connected to the logarithmic value readout circuit, a source connected to the photoelectric conversion element, and a drain connected to a power supply terminal;
a second N-type transistor having a gate connected to a connection point of the first N-type transistor and the photoelectric conversion element, and a drain connected to a reference terminal;
a P-type transistor between the second N-type transistor and the power supply terminal; and
a capacitance between the gate of the first N-type transistor and the gate of the second N-type transistor,
the detection pixel is configured to:
detect whether a change amount of the incident light amount exceeds a threshold value; and
output a detection signal that indicates a result of the detection, and
a drive circuit configured to:
drive the logarithmic response pixel and the detection pixel; and
output the analog signal and the detection signal.

* * * * *